US011463296B2

(12) United States Patent
Newman et al.

(10) Patent No.: US 11,463,296 B2
(45) Date of Patent: Oct. 4, 2022

(54) ERROR CORRECTION BY MERGING COPIES OF PAM-MODULATED 5G/6G MESSAGES

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

(21) Appl. No.: 17/674,191

(22) Filed: Feb. 17, 2022

(65) Prior Publication Data
US 2022/0224439 A1 Jul. 14, 2022

Related U.S. Application Data

(60) Provisional application No. 63/310,364, filed on Feb. 15, 2022, provisional application No. 63/310,240,
(Continued)

(51) Int. Cl.
H04L 27/26 (2006.01)
H04L 1/00 (2006.01)
(Continued)

(52) U.S. Cl.
CPC ........ H04L 27/2691 (2013.01); H04L 1/0003 (2013.01); H04L 1/0019 (2013.01);
(Continued)

(58) Field of Classification Search
CPC ... H04L 1/0047; H04L 1/0003; H04L 1/0061; H04L 1/1809; H04L 1/201; H04L 1/206; H04L 27/364
See application file for complete search history.

(56) References Cited

U.S. PATENT DOCUMENTS

2007/0089036 A1   4/2007   Jiang
2007/0089037 A1   4/2007   Jiang
(Continued)

Primary Examiner — Kabir A Timory
(74) Attorney, Agent, or Firm — Mayer & Williams PC

(57) ABSTRACT

Disclosed are procedures for measuring the modulation quality of each message resource element in a failed 5G or 6G communication modulated according to pulse-amplitude modulation, thereby revealing the most likely fault locations in the message. A second copy of the message can be merged by selecting the highest quality message elements from each version, where the quality is related to how far each message element's modulation deviates from the calibrated "states" of the modulation scheme. The receiver may also determine directional information based on the modulation of each message element, and may compare versions to determine the most likely correct state of each message element. Such strategies may directly recover the original message, or may greatly reduce the number of variations that need to be tested. When implemented, fault mitigation as disclosed herein can resolve message failures, improve communication reliability, reduce latency, and improve network operations overall, according to some embodiments.

9 Claims, 12 Drawing Sheets

Related U.S. Application Data filed on Feb. 15, 2022, provisional application No. 63/309,750, filed on Feb. 14, 2022, provisional application No. 63/309,748, filed on Feb. 14, 2022, provisional application No. 63/282,770, filed on Nov. 24, 2021, provisional application No. 63/281,847, filed on Nov. 22, 2021, provisional application No. 63/281,187, filed on Nov. 19, 2021, provisional application No. 63/280,281, filed on Nov. 17, 2021, provisional application No. 63/230,926, filed on Aug. 9, 2021, provisional application No. 63/159,195, filed on Mar. 10, 2021, provisional application No. 63/159,238, filed on Mar. 10, 2021, provisional application No. 63/157,090, filed on Mar. 5, 2021, provisional application No. 63/151,270, filed on Feb. 19, 2021.

(51) Int. Cl.

| | | |
|---|---|---|
| *H04W 28/04* | (2009.01) | |
| *H04L 1/08* | (2006.01) | |
| *H04L 1/20* | (2006.01) | |
| *H04L 27/02* | (2006.01) | |
| *H04L 27/34* | (2006.01) | |
| *H04L 1/16* | (2006.01) | |
| *H04L 1/18* | (2006.01) | |
| *H04L 27/36* | (2006.01) | |

(52) U.S. Cl.
CPC .......... *H04L 1/0045* (2013.01); *H04L 1/0047* (2013.01); *H04L 1/0061* (2013.01); *H04L 1/08* (2013.01); *H04L 1/1607* (2013.01); *H04L 1/1809* (2013.01); *H04L 1/20* (2013.01); *H04L 1/201* (2013.01); *H04L 1/206* (2013.01); *H04L 27/02* (2013.01); *H04L 27/2614* (2013.01); *H04L 27/34* (2013.01); *H04L 27/364* (2013.01); *H04W 28/04* (2013.01)

(56) References Cited

U.S. PATENT DOCUMENTS

| | | |
|---|---|---|
| 2009/0046771 A1 | 2/2009 | Abe |
| 2010/0097939 A1 | 4/2010 | Yoneta |
| 2012/0311409 A1 | 12/2012 | Pedersen |
| 2013/0163656 A1 | 6/2013 | Sakamoto |
| 2013/0230127 A1* | 9/2013 | Ling .................. H04L 27/2695 375/340 |
| 2013/0346826 A1 | 12/2013 | Zopf |
| 2014/0376358 A1 | 12/2014 | Eder |
| 2015/0139350 A1 | 5/2015 | Sugihara |
| 2016/0080109 A1 | 3/2016 | Lee |
| 2017/0019210 A1 | 1/2017 | Yu |
| 2017/0134193 A1 | 5/2017 | Sugihara |
| 2017/0288912 A1 | 10/2017 | Rahmati |
| 2017/0311300 A1 | 10/2017 | Stanwood |
| 2017/0331734 A1 | 11/2017 | Cariou |
| 2020/0366409 A1 | 11/2020 | Xu |
| 2020/0394090 A1 | 12/2020 | Urban |
| 2021/0250049 A1 | 8/2021 | Gabrys |
| 2021/0273651 A1 | 9/2021 | Haftbaradaran |
| 2021/0328598 A1 | 10/2021 | Annamraju |
| 2021/0383207 A1 | 12/2021 | Beery |

\* cited by examiner

Q-BRANCH AMPLITUDE

I-BRANCH AMPLITUDE

ERROR CORRECTION BY MERGING COPIES OF PAM-MODULATED 5G/6G MESSAGES

PRIORITY CLAIMS AND RELATED APPLICATIONS

This application claims the benefit of U.S. Provisional Patent Application Ser. No. 63/151,270, entitled "Wireless Modulation for Mitigation of Noise and Interference", filed Feb. 19, 2021, and U.S. Provisional Patent Application Ser. No. 63/157,090, entitled "Asymmetric Modulation for High-Reliability 5G Communications", filed Mar. 5, 2021, and U.S. Provisional Patent Application Ser. No. 63/159,195, entitled "Asymmetric Modulation for High-Reliability 5G Communications", filed Mar. 10, 2021, and U.S. Provisional Patent Application Ser. No. 63/159,238, entitled "Selecting a Modulation Table to Mitigate 5G Message Faults", filed Mar. 10, 2021, and U.S. Provisional Patent Application Ser. No. 63/230,926, entitled "Error Detection and Correction in 5G by Modulation Quality", filed Aug. 9, 2021, and U.S. Provisional Patent Application Ser. No. 63/280,281, entitled "Error Detection and Correction in 5G by Modulation Quality in 5G/6G", filed Nov. 17, 2021, and U.S. Provisional Patent Application Ser. No. 63/281,187, entitled "Error Correction by Merging Copies of 5G/6G Messages", filed Nov. 19, 2021, and U.S. Provisional Patent Application Ser. No. 63/281,847, entitled "Retransmission of Selected Message Portions in 5G/6G", filed Nov. 22, 2021, and U.S. Provisional Patent Application Ser. No. 63/282,770, entitled "AI-Based Error Detection and Correction in 5G/6G Messaging", filed Nov. 24, 2021, and U.S. Provisional Patent Application Ser. No. 63/309,748, entitled "Error Detection and Correction in 5G/6G Pulse-Amplitude Modulation", filed Feb. 14, 2022, and U.S. Provisional Patent Application Ser. No. 63/309,750, entitled "Error Correction by Merging Copies of PAM-Modulated 5G/6G Messages", filed Feb. 14, 2022, and U.S. Provisional Patent Application Ser. No. 63/310,240, entitled "Retransmission of Selected PAM-Modulated Message Portions in 5G/6G", filed Feb. 15, 2022, and U.S. Provisional Patent Application Ser. No. 63/310,364, entitled "Artificial-Intelligence Error Mitigation in 5G/6G Messaging", filed Feb. 15, 2022, all of which are hereby incorporated by reference in their entireties.

FIELD OF THE INVENTION

The disclosure includes means for detecting and correcting wireless message errors by merging multiple transmitted copies of the message.

BACKGROUND OF THE INVENTION

Transmission faults are inevitable in wireless communication, due to noise, interference, attenuation, and other distortions. In 5G and 6G, faulted messages are detected according to an error-detection code in the message. Faulted messages may lead to retransmission requests and other delays. What is needed is means for determining which resource elements of a message are faulted, and means for repairing those faults.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a wireless receiver comprising non-transitory computer-readable media, the media comprising instructions that when executed by a computing environment cause a method to be performed, the method comprising: receiving a first wireless message comprising a first plurality of message elements, each message element of the first plurality modulated according to a modulation scheme, the modulation scheme comprising one or more predetermined amplitude levels and one or more states, each state comprising an I-branch signal having an I-branch amplitude and a Q-branch signal having a Q-branch amplitude; determining that the first wireless message is corrupted; receiving a second wireless message comprising a second plurality of message elements, each message element of the second plurality modulated according to the modulation scheme; determining that the second wireless message is corrupted; producing a merged message comprising a third plurality of message elements, each message element of the merged message selected from corresponding message elements of the first and second plurality according to a criterion; and determining whether the merged message is corrupted.

In another aspect, there is a receiver in a base station or a user node of a wireless network, configured to: receive a first message and a second message; determine a modulation quality of each message element of the first and second messages; prepare a merged message by selecting, for each message element of the merged message, whichever of the corresponding message elements of the first and second messages has a higher modulation quality; and determine whether the merged message is corrupted.

In another aspect, there is a method for correcting a fault in a wireless message, comprising: receiving a first copy of the message and determining that the first copy is corrupted; then receiving a second copy of the message and determining that the second copy is corrupted; determining, for each message element of the first and second copies, a modulation quality according to a difference between a modulation of the message element and a modulation state of a modulation scheme; and preparing a merged message by selecting, for each message element of the merged message, from the corresponding message elements of the first and second copies, whichever message element has higher modulation quality.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
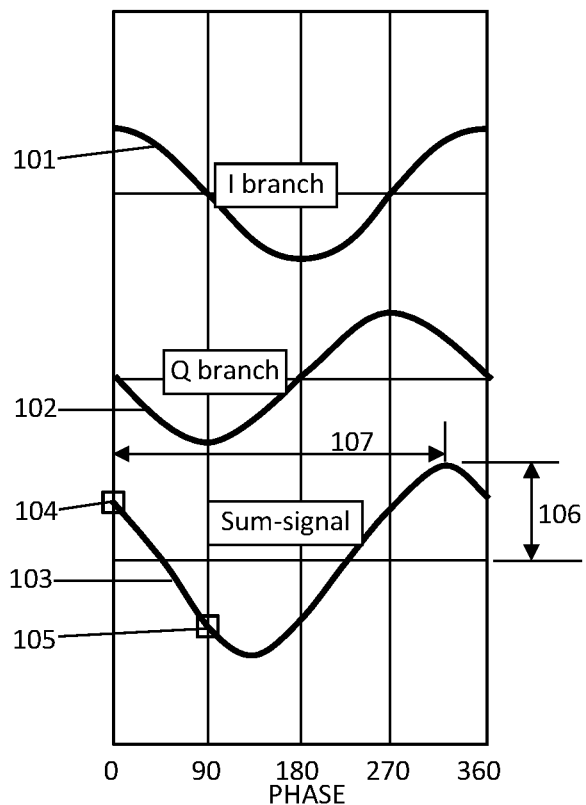
FIG. 1A is a chart showing exemplary embodiments of components of a PAM signal, according to some embodiments.

Disclosed herein are procedures for a wireless receiver to merge two corrupted copies of a message while correcting individual errors, thereby obtaining an uncorrupted version of the message. Systems and methods disclosed herein (the "systems" and "methods", also occasionally termed "embodiments" or "arrangements", generally according to present principles) can provide urgently needed wireless communication protocols to reduce retransmission burdens, improve reliability, and reduce overall delays in networks such as 5G and 6G networks, according to some embodiments. Commonly in wireless communication, interference or noise may distort one or more message elements, resulting in a corrupted message as received. The message may then be retransmitted, and the second copy may also be corrupted. The systems and methods disclosed herein include merging the two (or more) copies of a message to eliminate the incorrectly received message elements, by evaluating a modulation quality of each message element and selecting those message elements from the two copies having the highest modulation quality. The modulation quality may be based on how well the modulation of the message element matches the calibrated levels of the modulation scheme. This procedure is in contrast to prior-art "soft combining" in which message versions are merged based on the SNR (signal-to-noise ratio) of each version. Modulation quality provides a distinct, and in many cases superior, indication of which version of each message element is correct. As a further option, the receiver may determine an "overall quality factor" of each message element according to a formula that depends on both the message element's SNR and modulation quality, among other inputs. For example, a message modulated according to PAM (pulse-amplitude modulation) may include one or more message elements with improper amplitudes in the I or Q branch, and thereby reveal the fault location. The systems and methods disclosed herein can provide means for detecting one or more faulted message elements, and efficiently determining the correct value of those resource elements, thereby providing a low-latency and high-reliability solution to message fault problems, according to some embodiments.

Terms used herein generally follow 3GPP (Third Generation Partnership Project) usage, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. "Receiver" is to be construed broadly, including processors accessible by the recipient of a message, and configured to perform calculations on received signals or messages. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). "Vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. "RNTI" (radio network temporary identity) or "C-RNTI" (cell radio network temporary identification) is a network-assigned user code. "QoS" is quality of service, or priority. "QCI" (QoS class identifier) defines various performance levels. "QPSK" (quad phase-shift keying) is a modulation scheme with two bits per message element, and "16QAM" (quadrature amplitude modulation with 16 states) is a modulation scheme with 4 bits per message element. "SNR" (signal-to-noise ratio) and "SINR" (signal-to-interference-and-noise ratio) are treated equivalently herein.

"PAM" (pulse-amplitude modulation, not to be confused with signal generation by rapid pulsatile energy bursts) is a message modulation technology in which bits of a message are allocated to two sinusoidal "branch" signals, which are then amplitude-modulated to encode the message bits, and then summed with a 90-degree phase offset, and transmitted. The receiver can then receive the transmitted signal, separate the two branch signals, and measure their amplitudes. The receiver can demodulate the message elements by separating the two branch signals, measuring their amplitudes, and comparing to a set of predetermined amplitude levels of the PAM modulation scheme. The branches may be termed the "real" and "imaginary" branches, or the "I and Q" (in-phase and quadrature-phase) branches. A "constellation table" is a chart showing the I and Q modulation states of a PAM modulation scheme.

The "sum-signal" is the as-received waveform before separating the branches, or equivalently, the sum of the two branches. Each of the I-branch and Q-branch signals may be amplitude modulated according to one of the predetermined amplitude levels. For example, 16QAM has two predetermined amplitude levels, such as +1 and +3 in some units, and their negatives. Each branch can then be amplitude modulated as −3, −1, +1, or +3, thereby representing four possible "branch amplitudes". Each message element includes two branches, each of which has four branch amplitude possibilities, thereby providing 4×4=16 total modulation states, as expected for 16QAM.

In addition to the 3GPP terms, the following terms are defined herein. Although in references a modulated resource element of a message may be referred to as a "symbol", this may be confused with the same term for a time interval, among other things. Therefore, each modulated resource element of a message is referred to as a "modulated message resource element", or more simply as a "message element", in examples below. A "demodulation reference" is a set of modulated resource elements that exhibit levels of a modulation scheme (as opposed to conveying data). A "calibration set" is one or more amplitude values, which have been determined according to a demodulation reference, representing the predetermined amplitude levels of a modulation scheme, or the negative of those levels. A "sum-signal" is a signal produced by adding (or summing) the I-branch and Q-branch signals. A receiver, upon receiving the sum-signal, can separate the two branches therein, and measure the amplitude of each branch. A "branch amplitude" is the amplitude of an I or Q branch signal, as determined by a receiver. The receiver can demodulate a message element by extracting its I and Q branch signals, measuring their branch amplitudes, and comparing to the levels of a calibration set according to a preceding demodulation reference. An "amplitude deviation" of a message element is the difference between its I or Q branch amplitude and the closest predetermined amplitude level in the calibration set. Accordingly, the "modulation quality" of a message element is a measure of how close the I and Q branch amplitudes are to the closest predetermined amplitude level of the modulation scheme, or equivalently how close the modulation of the message element is to the closest state of the modulation scheme, as indicated by amplitude levels in the calibration set. Thus the "closest state" of the modulation scheme to a particular message element is the state that has the closest amplitude levels to the I-branch and Q-branch amplitudes. Each state corresponds to a first predetermined amplitude level and a second predetermined amplitude level, corresponding to the I-branch and Q-branch amplitudes of a demodulation reference, for example. The closest state to a particular message element is the state in which the difference between the first predetermined amplitude is closest to the message element's I-branch amplitude and the second predetermined amplitude is closest to the message element's Q-branch amplitude. The modulation quality may be calculated by adding those differences in magnitude, or the square root of the sum of the squares of the differences, or other formula relating the deviation of the message element's amplitudes from the modulation state's amplitudes.

A message may be configured "time-spanning" by occupying sequential symbol-times at a single frequency, or "frequency-spanning" on multiple subcarriers at a single symbol-time. An "EDC" (error-detecting code) is a field in a message configured to detect faults, such as a "CRC" (cyclic redundancy code) or a parity construct or the like. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message are changed relative to the original message. "Receptivity" is the quality of reception of a message. If one or more elements of a "subject" message have been changed when received, the message "fails the EDC test", that is, the embedded error-detection code disagrees with the bit-level content of the message. The fault may have occurred during the modulation step in the transmitter, or in propagation through the air, or at the receive side, and may be due to electronic noise or external interference or atmospheric absorption or scattering or reflection of the electromagnetic wave, to name just a few possible sources of message faults. Distortion of the I and Q branch amplitudes can cause the receiver to incorrectly demodulate the message elements, in which case the message fails the EDC test.

Upon detecting a faulted message, the recipient in 5G/6G can do one of several things. If the recipient knows that the faulted message is intended for that recipient, such as a base station that has scheduled an uplink message at a particular time or a user device receiving a scheduled downlink message, the recipient can request a retransmission after detecting the fault. For most downlink control messages, however, the user device does not know the time or frequency or length of the message, or even if the message is intended for that user device, because in 5G and 6G the downlink control messages are generally scrambled by the recipient's identification code. User devices then perform a "blind search" by attempting to unscramble candidate downlink control messages to locate their messages. However, a faulted message will disagree with its error-detection code, causing the message to appear as intended for some other user device, and would be ignored by the intended recipient. Then the user device, upon failing to receive the message within a predetermined interval, can request a retransmission, if it is expecting a message. Alternatively, the base station can retransmit the message after failing to receive an expected acknowledgement, among other options. In each case, substantial time is lost, and substantial extra transmission power is wasted, responding to a faulted message. Such delays may be especially critical for low-latency applications such as remote surgery and traffic safety.

In contrast, the disclosed systems and methods show how a receiver can merge two faulted copies of a message and process them to recover the original message. Merging a message with a retransmitted copy, while arranging to select the most likely correct version of each message element, may save time and enhance network reliability, among other benefits, according to some embodiments. The original and retransmitted versions generally differ in one or more message elements, which may be termed the "multi-valued" message elements. The receiver can determine a "modulation quality" of each multi-valued element by measuring their I and Q branch amplitudes, then comparing to the calibrated amplitude values of the modulation scheme (as obtained from a demodulation reference for example). The modulation quality is thereby calculated according to how far the branch amplitudes deviate from the calibrated amplitude levels of the closest state of the modulation scheme. Then, the receiver can merge the two copies by selecting each message element from the two versions, with the highest modulation quality for each multi-valued element. Alternatively, the receiver can merge the messages based on a combination of the modulation quality and the SNR of the multi-valued elements. In either case, the merged version is likely to have fewer faults than either of the as-received message versions.

If the merged version, with elements selected according to modulation quality (optionally including SNR), still fails the error-detection test, the receiver can search for the correct version by altering one or more of the multi-valued message elements. More specifically, the receiver can change which state, of the modulation scheme states, the message element is assigned to, and and can then determine whether the message so altered then agrees with the error-detection code. Starting with the merged message having each multi-valued element set at the value with the higher modulation quality, the receiver can then alter each of the multi-valued message elements one-at-a-time to the opposite value. If none of those alterations passes the error-detection test, the receiver can then alter all of the multi-valued elements in all combinations, testing each combination against the error-detection code. Further variations and options are detailed below.

Following are examples of PAM modulation schemes, according to which a faulted message element may be revealed and possibly repaired.

FIG. 1A is a chart showing exemplary embodiments of components of a PAM signal, according to some embodiments. As depicted in this non-limiting example, a PAM-modulated message element includes two "branches" labeled I and Q, each branch being a sinusoidal signal which is amplitude modulated at one of the predetermined amplitude levels (or its negative) of the modulation scheme. The branch amplitudes thereby encode the bits of the message element. The I branch 101 is depicted here as a cosine curve, while the Q branch 102 is a sine curve. The two branches 101, 102 are summed and transmitted as the sum-signal 103. The Q branch has zero signal at a zero-degree phase where the I branch is maximum, and the I branch is zero at the 90-degree phase at which the Q branch is maximum. The receiver, by selecting each branch separately (using RF mixers, for example), can measure the amplitude of each branch, and thereby identify the message bits encoded in those amplitude levels. For example, the receiver may determine that the "branch amplitude" of the I branch 101 is as indicated by a square 104, and the amplitude of the Q branch 102 is as indicated by another square 105.

Generally, the transmitter sets each of the branch amplitudes 104 and 105 to equal one of the predetermined amplitude levels of the modulation scheme, or its negative. For example, in 16QAM with PAM modulation, there are two predetermined amplitude levels (such as +1 and +3 in some units), and their negatives. Each branch can then be amplitude modulated according to one of the predetermined amplitude levels or its negative, such as +3, +1, −1, −3). In this context, the "predetermined amplitude levels of the modulation scheme" can include both positive and negative values, thereby including all four predetermined values in the calibration set by which the received message elements are then demodulated. The values are generally arranged to be uniformly separated. The sum-signal 103 is the sum of the two branches 101 and 102, each with a branch amplitude set equal to one of those four values, thereby constructing 16 possible states. Higher-order modulation include more predetermined levels (three in 64QAM, in for 256QAM, and so forth). QPSK, with 4 states, has only a single predetermined amplitude level, which can be positive or negative for each of the two branches, thereby forming 4 states as expected. As mentioned, in PAM the number of states in the modulation scheme is then $(2L)^2$, accounting for both positive and negative values of the L predetermined amplitude levels of the modulation scheme.

In some embodiments, the receiver can also analyze the sum-signal itself 103 to extract further information about the modulation quality, or to reveal modulation information more readily measured than the branch amplitudes. For example, the figure further indicates as 106 the amplitude of the sum-signal, and its peak phase as 107. As described below, the receiver may extract fault information by testing the sum-signal properties, and/or by comparing the sum-signal properties to the expected PAM levels.

Figure 1B:
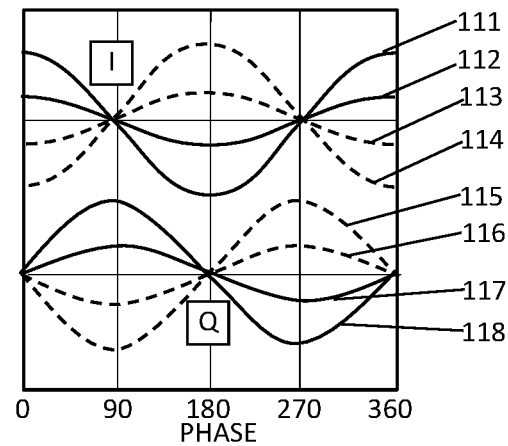
FIG. 1B is a chart showing exemplary embodiments of further components of a PAM signal, according to some embodiments.

FIG. 1B is a chart showing exemplary embodiments of further components of a PAM signal, according to some embodiments. As depicted in this non-limiting example, eight waves are shown depicting I branches and Q branches for various modulation states. In PAM, a small number (such as two) positive amplitude levels may be predetermined. In modulating the branches of a message element, the amplitude levels may be provided as either positive or negative values, and the phase may be provided as zero or 90 degrees, thereby composing the eight curves depicted. The message element is then transmitted with one of the four I waves added to one of the four Q waves, thereby generating 16 states of a modulation scheme such as 16QAM. In higher order modulation, more amplitude levels are provided, but the procedure is the same.

More specifically, wave 111 represents the maximally positive I branch signal, 112 the minimally positive I signal, and 113 and 114 the minimally and maximally negative I signals, respectively. On the Q branch, 118 and 117 are the maximally and minimally positive levels, while 115 and 116 are the maximally and minimally negative signals, respectively. The receiver, by determining which of the predetermined amplitude levels most closely matches the detected I or Q branch amplitude, can thereby demodulate the message element.

Figure 1C:
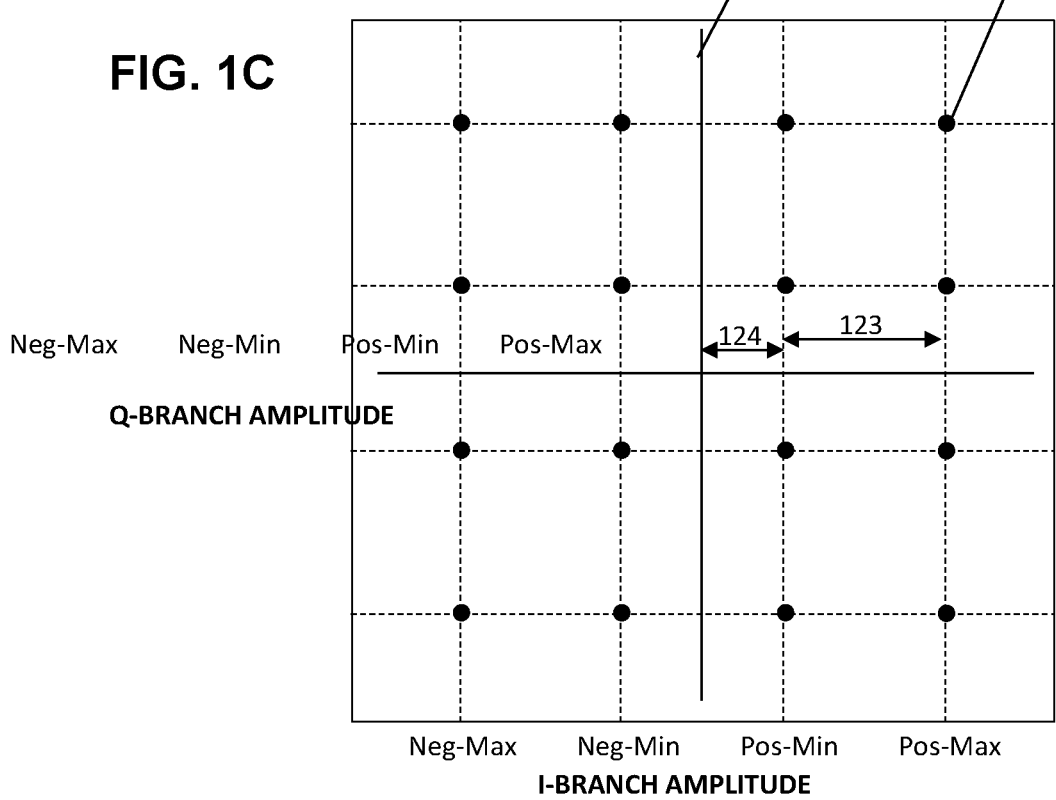
FIG. 1C is a "constellation" table showing an exemplary embodiment of states of a PAM modulation scheme, according to some embodiments.

FIG. 1C is a constellation chart showing an exemplary embodiment of states of a PAM modulation scheme, according to some embodiments. As depicted in this non-limiting example, 16 states are indicated as dots 125 in an array with the predetermined I-branch amplitude levels shown horizontally and the Q-branch amplitude levels vertically. The branch levels are labeled as "Pos-Max" for the maximally positive amplitude value, "Pos-Min" for the minimally positive amplitude level, then "Neg-Min and Neg-Max" for the maximally and minimally negative amplitude states. The transmitted message element is composed of one I-branch amplitude signal plus one Q-branch amplitude signal, transmitted together as a sum-signal.

The central cross shape 122 indicates zero amplitude. In PAM generally, zero amplitude is not used for messaging, and the branch phases are offset from the carrier by 45 degrees for carrier suppression. In the chart, the minimally positive amplitude is each displaced from zero by the value 124, and the maximally positive level is an additional amount 123. For example, the value 124 could represent one unit and the value 123 could represent two units, thereby providing that the various states are all separated from their adjacent neighbors by the same amount, namely two units. The receiver, by measuring the I and Q branch amplitudes and comparing to a previously-determined set of amplitude levels (from a demodulation reference, for example), can select the modulation state with the closest match to the measured amplitudes and thereby demodulate the message element.

The following examples indicate how faulted message elements in a PAM-modulated message may be detected.

Figure 2A:
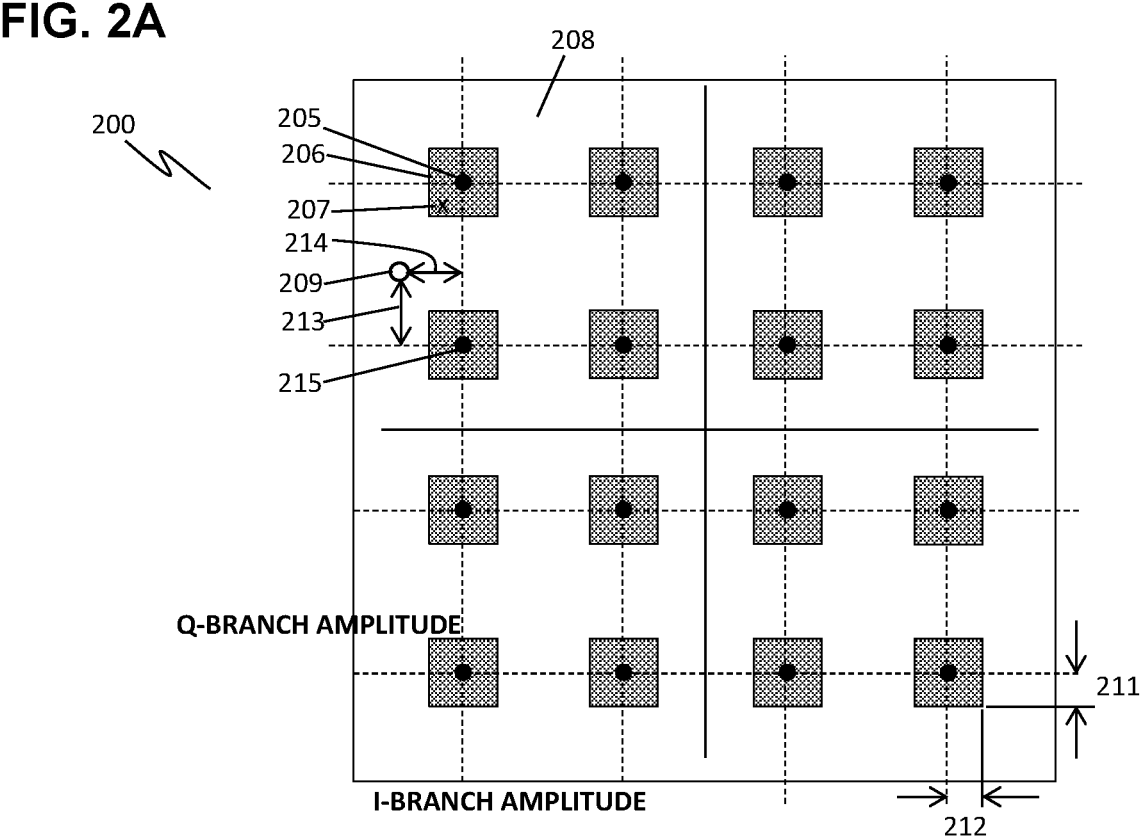
FIG. 2A is a schematic showing an exemplary embodiment of a constellation table for 16QAM, according to some embodiments.

FIG. 2A is a schematic showing an exemplary embodiment of a PAM constellation table, according to some embodiments. As depicted in this non-limiting example, a constellation table 200 includes 16 states 205 of 16QAM, each state 205 including one of the four I-branch amplitudes summed with one of the four Q-branch amplitudes. Around each modulation state 205 is a rectangular form in dark stipple representing a "good-modulation zone" 206 (or "good-mod" in figures). The size of the good-modulation zone 206 is shown as the dimensions 211 and 212. Usually, the good modulation zone 206 is square. If the receiver measures the message element's branch amplitudes to be within one of the good-modulation zones 206, the message element is assigned to the associated modulation state 205. For example, the small "x" 207 indicates a measured as-received message element, having an I-branch amplitude and a Q-branch amplitude accordingly, thereby falling within the good-modulation zone 206 of the associated state 205.

The exterior white space 208 is a "bad-modulation zone" (or "bad-mod") in which the modulation of the message element falls outside all of the good-modulation zones, and therefore is invalid or illegal and not used for modulation. For example, a particular message element is received with modulation in I and Q amplitudes as depicted by an "o" 209, which is in the bad-modulation zone 208. The received message element may exhibit an I-branch amplitude deviation 214 and a Q-branch amplitude deviation 213 relative to the closest modulation state, which in this case is 215. If the I-branch amplitude deviation 214 is greater than the good modulation zone width 212, or the Q-branch amplitude deviation 213 is greater than the good modulation zone height 211 (relative to the nearest state 215), then that message element is flagged as bad-modulation. In some embodiments, the bad-modulation message elements may be assigned to the nearest modulation state 215 initially, although this assumption may be revised later if the message fails its error-detection test.

After all of the message elements have been assigned to the closest states of the modulation scheme, the message may be checked against an error-detection code which is normally embedded in the message. If the message agrees with the error-detection code, the tentative assignment of the bad-modulation message elements is confirmed, and the message has been successfully demodulated. If not, the receiver may attempt to recover the message by altering the bad-modulation message elements. As used herein, "altering" a message element means changing which state of the modulation scheme is assigned to the message element. After changing the assigned state of the suspicious message element, the altered message may be tested again with the error-detection code to see if the altered message is the correct version.

Figure 2B:
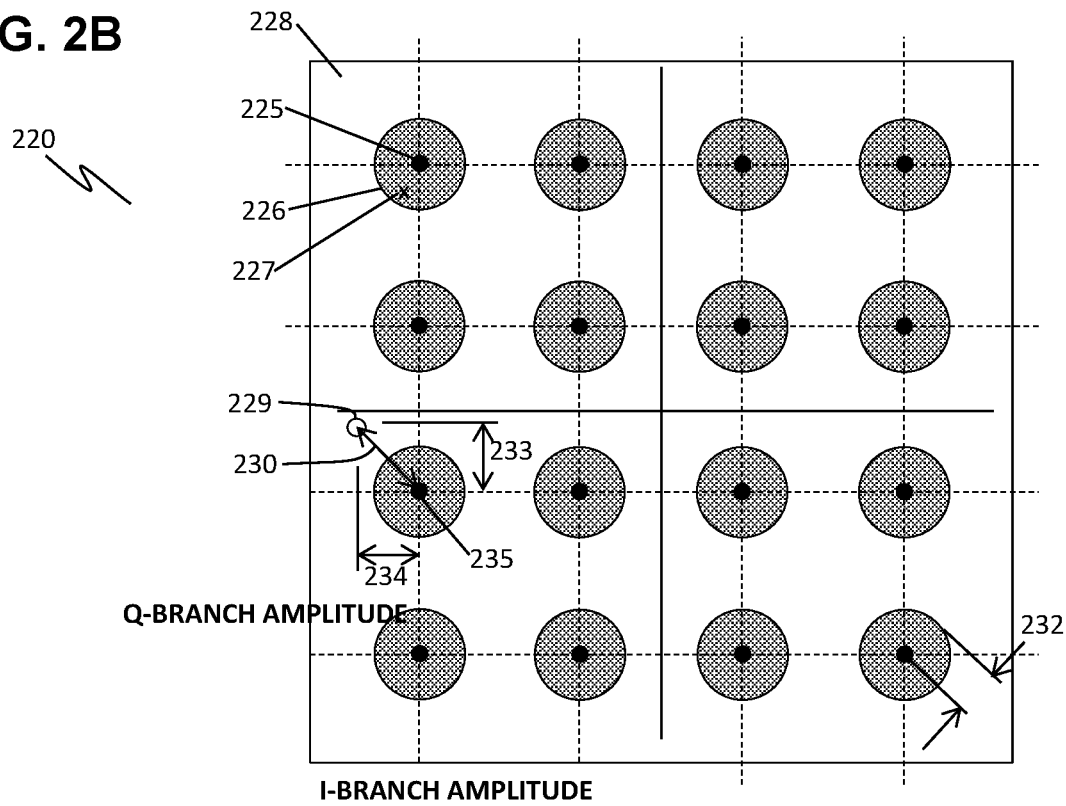
FIG. 2B is a schematic showing another exemplary embodiment of a constellation table for 16QAM, according to some embodiments.

FIG. 2B is a schematic showing another exemplary embodiment of a PAM constellation table for 16QAM, according to some embodiments. As depicted in this non-limiting example, the constellation table 220 may include four I-branch amplitude levels and four Q-branch amplitude levels, for sixteen states 225. Each state 225 is surrounded in this case by a circular good-modulation zone 226, each with a radius 232 as indicated. The exterior white space 228 represents bad-modulation.

A particular message element "x" 227 is shown in a good-modulation zone 226 associated with the state 225. The radial distance (not labeled) between the message element's modulation and the closest state is less than the radius 232 of the good-modulation zones.

Another message element "o" 229 has an I-branch amplitude deviation 234 and a Q-branch amplitude deviation 233, and is at a distance 230 from the nearest state 235. If that distance 230 is less than the radius 232 of the good-modulation zone, the message element is allocated to "good-modulation". However, in this case the distance 230 is greater than the radius 232, and therefore the message element is flagged as "suspicious" or "bad-modulation" and may be altered later for fault mitigation, if needed. Initially, however, the message element may be assigned to the nearest state 235 for purposes of demodulating the message.

While the figure shows the 16QAM modulation scheme, many other modulation schemes are possible. For example, 64QAM and 256QAM involve additional I and Q amplitude levels, whereas QPSK has only a single amplitude level (repeated positive and negative, I and Q, thereby making four QPSK states). The methods described herein for 16QAM can be applied straightforwardly to QPSK and higher QAM modulation schemes, according to some embodiments.

The figure, and the other examples to follow, are presented according to a standard pulse-amplitude modulation scheme. In other embodiments, however, the message may employ classical amplitude and phase modulation, in which each message element is amplitude modulated according to one of Namp amplitude levels and phase-modulated according to one of Nphase phase levels. The multiplexed amplitude and phase modulations thereby generate Namp×Nphase distinct states. For example, with classical amplitude-phase modulation, 16QAM has four amplitude and four phase levels, resulting in 16 combinations. Upon receipt, the receiver measures the amplitude and phase of the signal, then selects whichever predetermined state most closely matches those values. The systems and methods described herein are straightforwardly applicable to classical amplitude and phase modulation as well as other modulation technologies. As long as the modulation scheme involves modulating the phase and/or the amplitude of an electromagnetic wave, it is immaterial which modulation technology is employed. For consistency and clarity, most of the examples refer to PAM, however the principles disclosed herein may apply to each of these modulation technologies, as will be apparent to artisans with ordinary skill in the art after reading the present disclosure.

Figure 3:
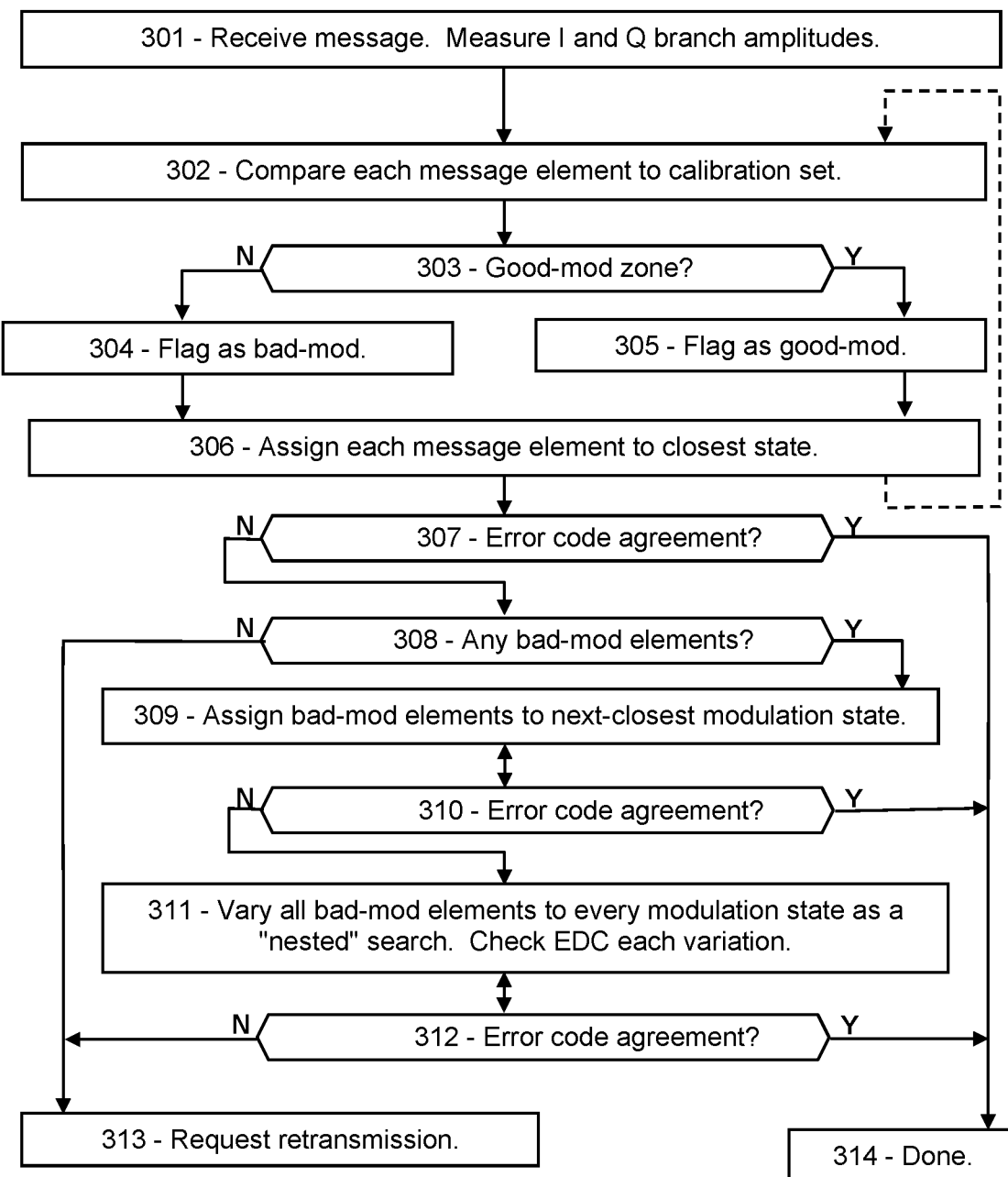
FIG. 3 is a flowchart showing an exemplary embodiment of a process for detecting and correcting message errors, according to some embodiments.

FIG. 3 is a flowchart showing an exemplary embodiment of a process for detecting and correcting message errors, according to some embodiments. As depicted in this non-limiting example, a receiver may receive a message at 301, and may measure the amplitude of each I and Q branch of each message element at 302, and compare each message element's amplitude values to the amplitude levels of a calibration set, which represents the states of the modulation scheme. At 303, the receiver determines whether each message element's amplitude values fall within a predetermined range of one of the states of the modulation scheme. If so, at 305 the message element is flagged as good-modulation. If the message element's amplitudes are outside the range of the states of the modulation scheme (or if the distance to the nearest state is greater than the good-modulation radius), then the message element is flagged as bad-modulation at 304. In either case, at 306 the message element is assigned the nearest modulation state initially. The state determinations, allocations, and assignments are repeated for each message element, as suggested by a dashed arrow.

At 307, after assigning each message element to the closest state, the receiver can compare the message to an error-detection code. If there is agreement, the message is assumed to be correctly demodulated, and the task is done at 314. If the message fails the error-detection code, then at 308 the receiver can determine whether the message includes any message elements flagged as bad-modulation. If not, then the receiver may request a retransmission at 313, or other action depending on reception rules and other conditions. If at 308 there is at least one message element flagged as bad-modulation, then at 309, the receiver may alter the assigned state of each bad-modulation element to the next-closest modulation state instead of the closest one. The "next-closest" state is the closest state to the message element's modulation, except the closest one. Some types of noise and interference cause mainly small changes in the branch amplitudes of the message elements, and therefore an economical strategy for recovering the message may be to alter each bad-modulation element by a small amount, testing each such alteration against the error-detection code.

At 310, the message with the altered assignment is tested against the error-detection code, and if there is agreement, the task is done at 314. If not, the receiver may continue altering any remaining bad-mod element assignments to their next-closest state, one at at time, and test each alteration. After testing each one of the bad-mod elements individually in this way, the receiver can then alter the bad-mod elements two at a time, testing each alteration for agreement with the error-detection code. If not successful, the receiver can alter the assignments in combinations of three, and other numbers of bad-mod elements, altering each one to the nearest and next-nearest states of the modulation scheme. The receiver can continue varying the bad-mod elements until all possible combinations of the bad-mod elements have been altered to their next-closest state of the modulation scheme, and can test each altered message against the error-detection code. This process is a loop, cycling through steps 309 and 310 repeatedly until all combinations have been tested. However, for clarity in the figure, the steps are shown simply as a command 309 and an interrogator 310, with a double-ended arrow between them. The double-ended arrow indicates that the two steps are to be performed repeatedly and cyclically until all the associated variations have all been tested, and aborting the loop if any of the variations passes the EDC test.

If the message fails the error-detection test for all of the alterations of the bad-mod elements to their closest and next-closest states, the flow proceeds to 311 for a more exhaustive search. Here each of the bad-mod message elements is again altered sequentially, but now they are varied to all of the states of the modulation scheme, instead of being restricted to just the closest and the next-closest states, and each such alteration is tested (skipping the already-tested alterations, however). Each of the bad-mod message elements can be tested sequentially at each of the states, while all of the other bad-mod message elements are also altered in turn. Such a grid search, in which two or more items are independently varied among multiple settings, and all possible combinations are tested, may be termed a "nested" search. For example, if there are B bad-mod message elements and the modulation scheme has S states, the number of combinations is $S^B$ separate tests. If any of those tests results in agreement with the error-detection code at 312, the task is done at 314. If none of the tests is in agreement, at 313 a retransmission is requested. The current message is then abandoned, or, in another embodiment, the message may be retained for analysis when the retransmitted version is received.

In most cases, the time required for a retransmission may be much longer than the time required to alter an assigned modulation state of a message element and compare to the error-detection code, and therefore it may be economical to attempt to repair the faulted message in this way, by altering the state assignments of the message elements having the worst modulation quality, as measured by how far the branch amplitude values fail to match the levels of the calibration set. However, there is a limit to how many alterations the receiver can test in a given time. If the number of bad-modulation message elements exceeds a threshold number, the receiver may request a retransmission immediately instead of embarking on a probably futile effort to repair the message.

Figure 4A:
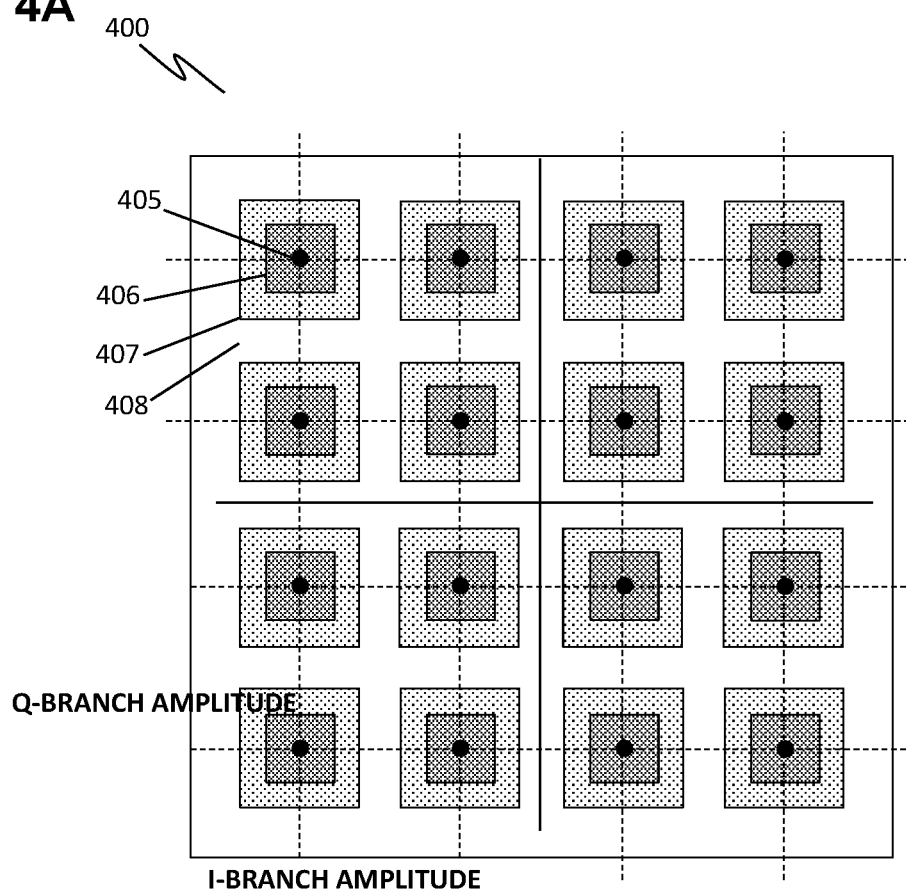
FIG. 4A is a schematic sketch showing an exemplary embodiment of a constellation table with multiple levels of modulation quality, according to some embodiments.

FIG. 4A is a schematic sketch showing an exemplary embodiment of a constellation table with multiple levels of modulation quality, according to some embodiments. As depicted in this non-limiting example, a constellation table 400 (for 16QAM in this case) includes four I-branch amplitude levels, four Q-branch levels, and sixteen states 405. Around each state 405 is a good-modulation zone 406 in dark stipple, surrounded by a marginal (that is, marginal quality) modulation zone 407 in light stipple, and the remaining white space 408 is a bad-modulation zone. A message element with modulation falling in (or occupying) one of the good-modulation zones 406 may be assigned to the associated state 405 of the modulation scheme. A message element with modulation falling in the marginal-modulation zone 407 may also be assigned to the associated state 405, but with a flag indicating that it is suspicious due to its lower quality of fit to the predetermined amplitude levels. A message element with modulation falling in the bad-modulation zone 408 may be assigned to the nearest state 405, but with a flag indicating that it is bad-modulation or very suspicious. If the message is subsequently determined to be faulted, the bad-modulation elements may be altered first, to determine whether any alterations may satisfy the EDC test. If none of those variations succeeds in agreeing with the error-detection code, then the bad-modulation elements and the marginal-modulation elements may be varied together in a nested grid search. The lowest-quality, bad-modulation elements may be varied first because they are the most likely sources of the message failure. If those variations fail to agree with the error-detection code, or if there are no bad-modulation elements, then the message elements with marginal quality modulation may be varied. However, if the number of bad-modulation and marginal-modulation elements exceeds a maximum value, the receiver may request a retransmission instead of performing a grid search, due to the time and calculational effort required to perform large numbers of variations.

Figure 4B:
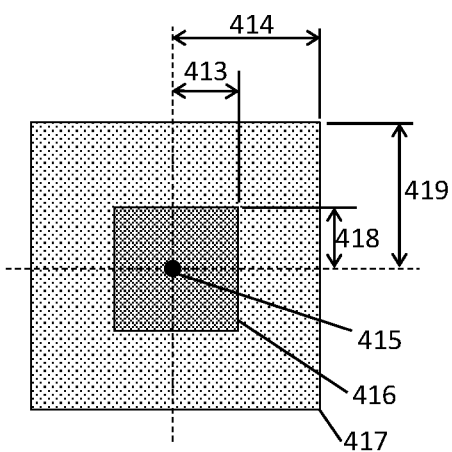
FIG. 4B is a schematic sketch showing an exemplary embodiment of a single modulation state with multiple levels of modulation quality, according to some embodiments.

FIG. 4B is a schematic sketch showing an exemplary embodiment of a single modulation state with multiple levels of modulation quality, according to some embodiments. As depicted in this non-limiting example, a modulation state 415 (such as one of the modulation states of the previous figure) may be configured as the multiplexed I and Q amplitude modulations of the modulation scheme. The modulation state 415 may be surrounded by a good-modulation zone 416, and further surrounded by a marginal-modulation zone 417. The good-modulation zone 416 may be a rectangular region with a half-width 413 in the I-branch and 418 in the Q-branch as shown. The marginal-modulation zone 417 may be a rectangular region with half-dimensions 414 and 419. Message elements modulated in the good-modulation zone 416 may be assigned the associated state 415 with high probability. Message elements modulated in the marginal-modulation zone 417 may also be assigned the state 415 too, but flagged as suspicious. Message elements modulated exterior to the marginal-modulation zone 417 may also be assigned the state 415 if that is the closest one, but may be flagged as likely bad-modulation for the purposes of mitigating faults.

Figure 4C:
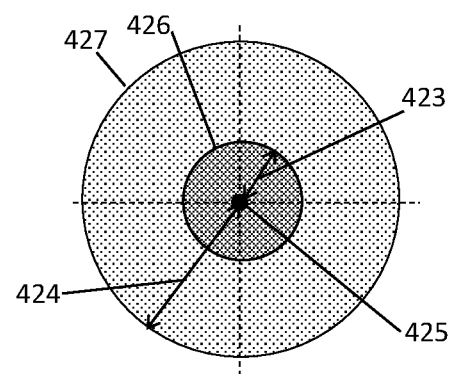
FIG. 4C is a schematic sketch showing another exemplary embodiment of a single modulation state with multiple levels of modulation quality, according to some embodiments.

FIG. 4C is a schematic sketch showing another exemplary embodiment of a single modulation state with multiple levels of modulation quality, according to some embodiments. As depicted in this non-limiting example, a single modulation state 425 may be surrounded by a round region of good modulation 426 which may be surrounded by an annular region of marginal quality modulation 427. The radius 423 of the good-modulation region 426 is shown, and the outer radius 424 of the marginal-modulation region 427 is shown. Thus a message element may be allocated to the good-modulation category if the I and Q branch amplitudes are such that the modulation falls in the good-modulation zone 426, and likewise for the marginal-modulation zone 427. For example, the "distance" of the message element from the state 425 may be calculated as the square root of the I-branch amplitude deviation squared plus the Q-branch amplitude deviation squared. If this distance is less than the good-modulation radius 423 the message element, is allocated good modulation quality. If the distance is greater than the good-modulation radius 423 but less than the marginal-modulation radius 424, the message element may be allocated marginal modulation quality. If the distance is greater than the marginal-modulation radius 424, the message element may be allocated bad modulation quality. The foregoing examples involved categorizing message elements into two or three categories according to modulation quality, and altering the message elements in each category. In some embodiments, the receiver may use any number of such categories, not restricted to two or three. In some embodiments, the receiver may eschew categories and may instead select which message elements to alter based on the calculated distance, in phase-amplitude space, of each message element from the closest state.

Figure 5:
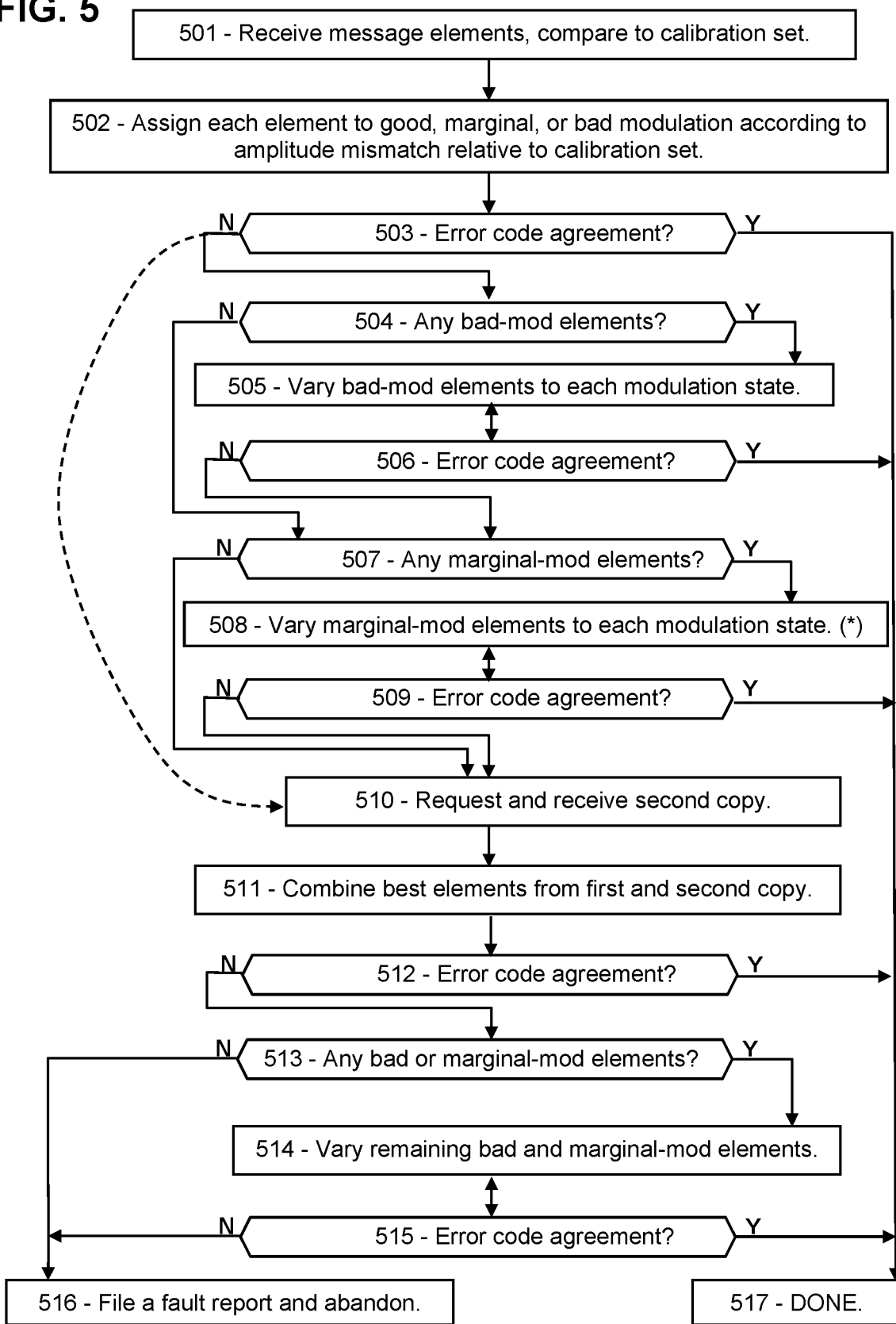
FIG. 5 is a flowchart showing an exemplary embodiment of a process for detecting and correcting message errors using multiple levels of modulation quality, according to some embodiments.

FIG. 5 is a flowchart showing an exemplary embodiment of a process for detecting and correcting message errors using multiple levels of modulation quality, according to some embodiments. As depicted in this non-limiting example, at 501 a receiver receives a message and compares each message element to the amplitude levels previously provided in a calibration set. The calibration set includes the I-branch and Q-branch amplitude levels of the modulation scheme, as provided by a demodulation reference, for example. At 502, the receiver assigns each message element to the closest state of the modulation scheme, and also categorizes the modulation quality of each message element as good, marginal, or bad-modulation depending on the distance of the message modulation to the nearest state of the modulation scheme. After attempting to demodulate the message elements, the receiver compares the message to an error-detection code at 503. If the message agrees with the error-detection code, the task is done at 517. If not, the receiver checks, at 504, whether the message contains any bad-modulation elements, and drops to 507 if not. If the message has one or more bad-modulation elements, at 505 the receiver varies the bad-modulation elements among all of the states of the modulation scheme in a nested grid search, as indicated by a double arrow. For example, the receiver may alter the first bad-modulation element successively to each state, while keeping the other bad-modulation elements assigned to their closest states, and may test each variation against the error-detection code. The receiver may perform a similar scan using the second bad-modulation element while keeping all the others at their closest state values, and may continue such a single-element variation until all of the bad-modulation elements have been explored individually. Then, if no match has been found, the receiver may vary combinations of the bad-modulation elements across all of the states, testing all combinations of the bad-modulation elements at all states of the modulation scheme. If any one of those variations satisfies the error-detection code, the message is correctly demodulated and the task is done at 517. If not, the flow proceeds to 507.

At 507, the receiver determines whether the message has any marginal-modulation elements, and if so, it varies the marginal-modulation elements and the bad-modulation elements together in a nested search at 508, as indicated by a double arrow. (The asterisk is explained later.) The receiver can vary the bad and marginal-modulation elements in an exhaustive grid search by setting each of the suspicious elements to each of the states of the modulation scheme, and test the error-detection code for each variation at 509. If any of those variations agrees with the error-detection code, the task is done. If not, or if there are no marginal-modulation elements, the receiver may request and receive a second copy of the message at 510, and may merge the first and second copies by selecting the message elements with the best quality modulation at 511, and then may test the merged version against the error-detection code at 512. If successful, it is done. If not, the flow proceeds to 513.

At 513, the receiver may determine whether the merged message still includes any bad or marginal-modulation elements. The receiver may also note any message elements that differ in the originally received version and the retransmitted version, yet occupy good-modulation zones in each version. Such message elements are termed "paradoxical", and may be flagged as suspicious since the two message copies contradict each other. If the merged message has all good-modulation message elements and no suspicious (bad or marginal or paradoxical) message elements, yet still fails the EDC test, then there is some kind of problem, in which case the receiver may abandon the message at 516 and optionally file a fault report. However, if the merged message has one or more suspicious message elements at 514, the receiver may vary those in another nested search such as described above, testing each variation at 515. If one of those variations agrees with the error-detection code, the task is finally done. If not, the receiver may abandon at 516.

In some embodiments, the receiver may determine the modulation quality as a calculated value, instead of the good-marginal-bad categories. The receiver can then vary the remaining suspicious elements according to the modulation quality value, starting with the message element that has the lowest modulation quality. The receiver can then proceed to vary and test the second-lowest modulation quality message element, and so forth until the error-detection code matches.

In some embodiments, the amount of time required to perform the searches of 506 and 509 may exceed the amount of time to request and receive a second copy of the message, in which case the receiver may request the second copy as soon as the initial version fails the error-detection code, as indicated by a dashed arrow. The receiver may already know how much time it takes to test all combinations given the number of bad and marginal-modulation elements, using an algorithm for example. While waiting for a retransmission, the receiver may continue to test variations, since the receiver might succeed in demodulating the message before the retransmitted message arrives.

In some embodiments, the variations of the marginal-modulation message elements at 508 may be done in two stages for improved efficiency, as indicated by an asterisk (*). Many types of noise cause only small changes in the modulation of message elements, whereas interference from a nearby transmission can cause a large change in the message element. If the background is due mainly to noise or to low-amplitude interference, the amount of distortion produced upon each message element may be small. In that case, the message elements with marginal quality modulation are likely to belong to the associated state or to one of the adjacent states of the modulation scheme, as opposed to a more distant state that differs by a large amount in amplitude and phase. Therefore, the distortion is more likely to move the I-branch or Q-branch amplitude (or both) by one amplitude step than a larger number of amplitude steps. The receiver may exploit this by altering each of the marginal-modulation message elements to its nearest neighbors and testing those small-step alterations first, before attempting larger jumps. For example, a particular state of the modulation scheme has eight adjacent states if the particular state is in the middle of the constellation table, or five adjacent states if at one edge, or three adjacent states if at a corner. The receiver may save time and enhance the likelihood of finding a solution by testing those eight (or five or three) nearest-neighbor alterations first, before testing the larger variations across the entire constellation table. If the message has more than one marginal-modulation element, the receiver may perform a nested grid search by altering the assigned state of each of the marginal-modulation message elements to each of their adjacent states, exploring all combinations of all marginal-modulation elements in their adjacent states. If none of those adjacent-neighbor alterations passes the EDC test, then the receiver may proceed to vary the marginal-modulation message elements across the entire set of states of the modulation scheme (preferably skipping the alterations that have already been checked). By testing the most likely combinations of message alterations first, the receiver may avoid a large number of unlikely variations, and may thereby resolve the fault and recover the correct message quickly, according to some embodiments.

The systems and methods disclosed herein further include "directional sectors" defined around each state of the modulation scheme. The directional sectors may indicate how a faulted message may be recovered, according to some embodiments.

Figure 6A:
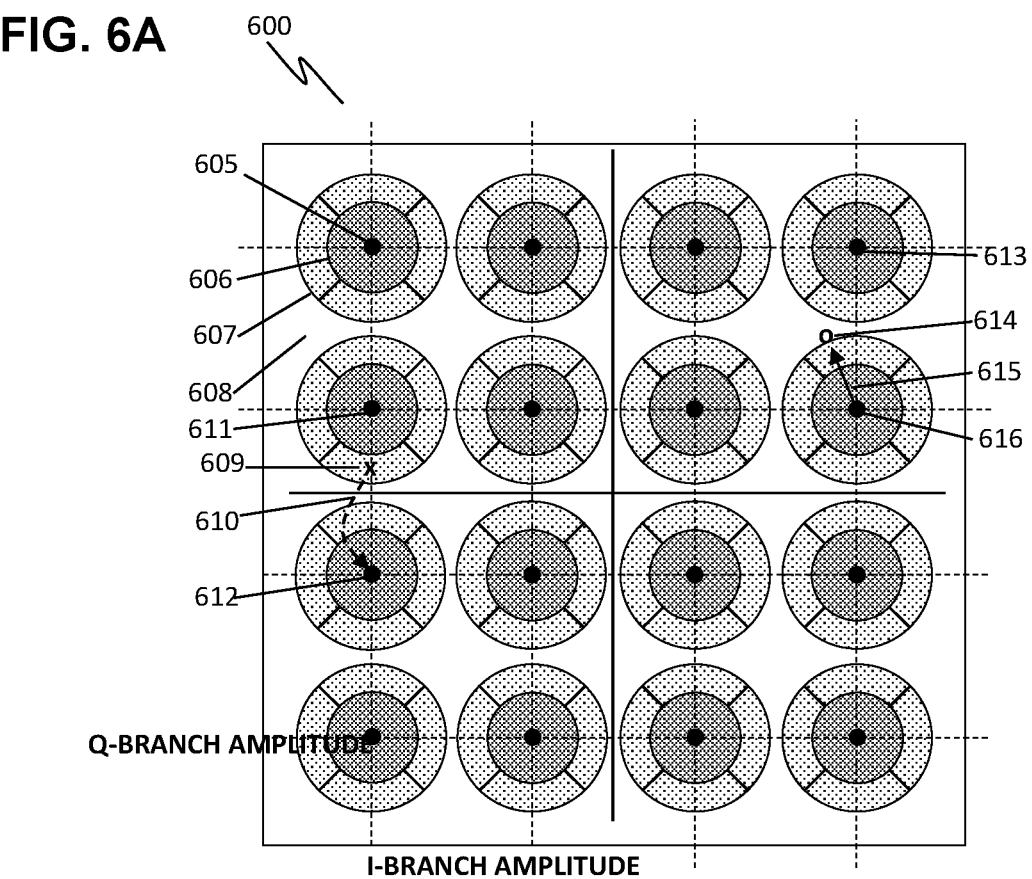
FIG. 6A is a schematic sketch showing an exemplary embodiment of a constellation table for 16QAM with directional deviation sectors, according to some embodiments.

FIG. 6A is a schematic sketch showing an exemplary embodiment of a constellation table for 16QAM with directional deviation sectors, according to some embodiments. As depicted in this non-limiting example, a constellation table 600 includes states 605, each state surrounded by a good (quality) modulation zone 606 and a marginal (quality) modulation zone 607 within white space bad (quality) modulation area 608. The marginal-modulation zones 607 are divided into multiple sectors, as explained in more detail in the next figure.

The sectors may assist the receiver in recovering a faulted message. For example, if a message fails the EDC test, the receiver may look for a particular message element modulated in a marginal-modulation zone 607, such as the "x" 609. The message element represented by the "x" 609 is initially assigned to the nearest state which is 611. However, since the message fails the error-detection test with that assignment, and since the "x" message element's modulation quality is only marginal, the receiver may attempt to correct the message by altering the assignment to a different state. For example, the receiver may alter the assignment to the adjacent state in a direction indicated by the sector that the "x" 609 occupies, that is, altering the assignment to the state 612. In the depicted case, the "x" 609 is in a sector directed toward a lower Q-branch amplitude state with the same I-branch amplitude, and therefore the receiver may attempt altering the message element to the next-lower Q-branch amplitude 612, as indicated by a dashed arrow 610, and may test that message alteration against the EDC code. Direction-assisted alteration may be an economical strategy for mitigating a message fault first in a direction as indicated by the occupied sector, before embarking on a wider search. The receiver may thereby enhance the probability that the correct state assignment may be determined without having to vary multiple message element assignments across the entire modulation table.

The figure further depicts another message element "o" 614 which lies in the bad-modulation zone 608 but has been assigned to the nearest state 616 of the modulation scheme. Also shown is an arrow 615 indicating a direction of the message element's modulation relative to the nearest state 616. If the message is found to be faulted, then the bad-modulation message element 614 may be re-assigned to the closest neighboring state in the direction of the arrow 615, which in this case is the state 613, and that alteration may be tested against the error-detection code. Instead of using sectors to define a direction, and instead of restricting the directionality to just the marginal-modulation elements, the arrow 615 pointing toward the message element's location on the constellation table may be used to guide the first and most likely alteration, which is to state 613 in this case.

In some embodiments, the receiver may determine which message elements are most likely faulted, and in which direction to alter the state assignment, according to calculations instead of zones and sectors. For example, the receiver can determine a modulation quality according to a distance from the message element's modulation to the nearest state of the modulation scheme, and can calculate a direction according to the position of the message element's modulation relative to the nearest state. If the distance is larger than the distances of any of the other message elements of the message, then the receiver may alter the state assignment of that lowest-quality message element to the adjacent state in the direction calculated, and thereby test the most likely version of the message before embarking on a long and tedious nested search.

Figure 6B:
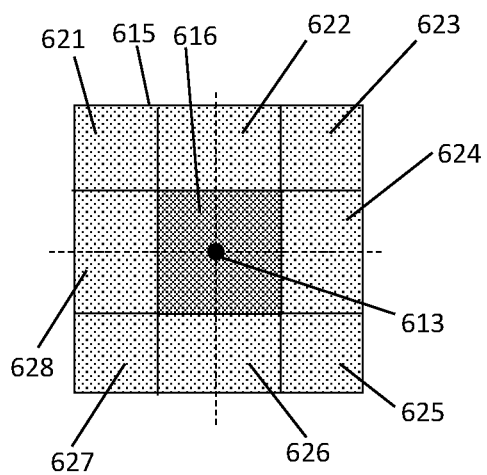
FIG. 6B is a schematic sketch showing an exemplary embodiment of a single modulation state with directional deviation sectors, according to some embodiments.

FIG. 6B is a schematic sketch showing an exemplary embodiment of a single modulation state with directional deviation sectors, according to some embodiments. As depicted in this non-limiting example, a modulation state may include a state 613 with a good-modulation zone 616 surrounded by a marginal-modulation zone 615. The marginal-modulation zone 615 is divided into eight sectors in this case, 621, 622, 623, 624, 625, 626, 627, and 628. The sectors 621-628 may assist the receiver in determining how to modify and recover a faulted message. For example, if the message as-received fails the error-detection code and one of the message elements is modulated according to, say, sector 624, then the receiver may alter that message element to the adjacent state in the indicated direction, and may test that variation.

It may be noted that a state may not have an adjacent state in a specified direction. If the current modulation state 613 is already at the edge of the constellation table, then the receiver cannot increase the state assignment further, and therefore may ignore the sector information if the occupied sector points in an illegal direction.

Figure 6C:
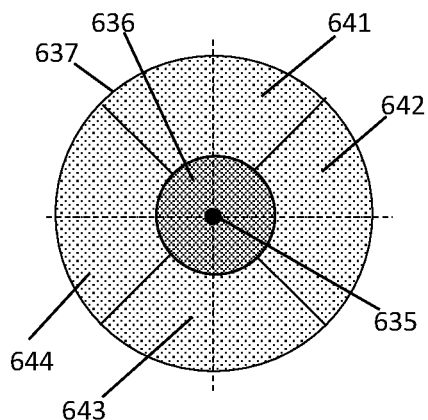
FIG. 6C is a schematic sketch showing another exemplary embodiment of a single modulation state with directional deviation sectors, according to some embodiments.

FIG. 6C is a schematic sketch showing another exemplary embodiment of a single modulation state with directional deviation sectors, according to some embodiments. As depicted in this non-limiting example, a single modulation state of a modulation scheme is indicated as 635, surrounded by a good modulation zone 636 and a marginal modulation zone 637 which is divided into four sectors 641, 642, 643, 644. As in the previous example, the receiver may receive a faulted message containing at least one marginal-modulation element, and may attempt to recover the message by altering the state assignment of that marginal-modulation element. Initially, the assignment may be altered to an adjacent state in the direction of the sector in which the message element occurs. By making the most likely alterations first, the receiver may thereby find the correct message quickly, saving time and reducing the calculation burden. The receiver may thereby use the sector information present in the marginal-modulation elements of a faulted message as a guide for varying the state assignments of those message elements. If those initial small steps fail to agree with the error-check code, then larger variations may be tested before abandoning the message.

In another embodiment, instead of using categories of modulation quality and sectors in the marginal-modulation zone, the receiver may calculate a direction based on the I and Q amplitude deviations, and may alter a message element with low modulation quality to an adjacent state according to the calculated direction. Basing the initial alteration on the direction of a message element with low modulation quality, relative to the closest state of the modulation scheme, may thereby test the most likely version of the message before attempting a wider search.

Figure 7:
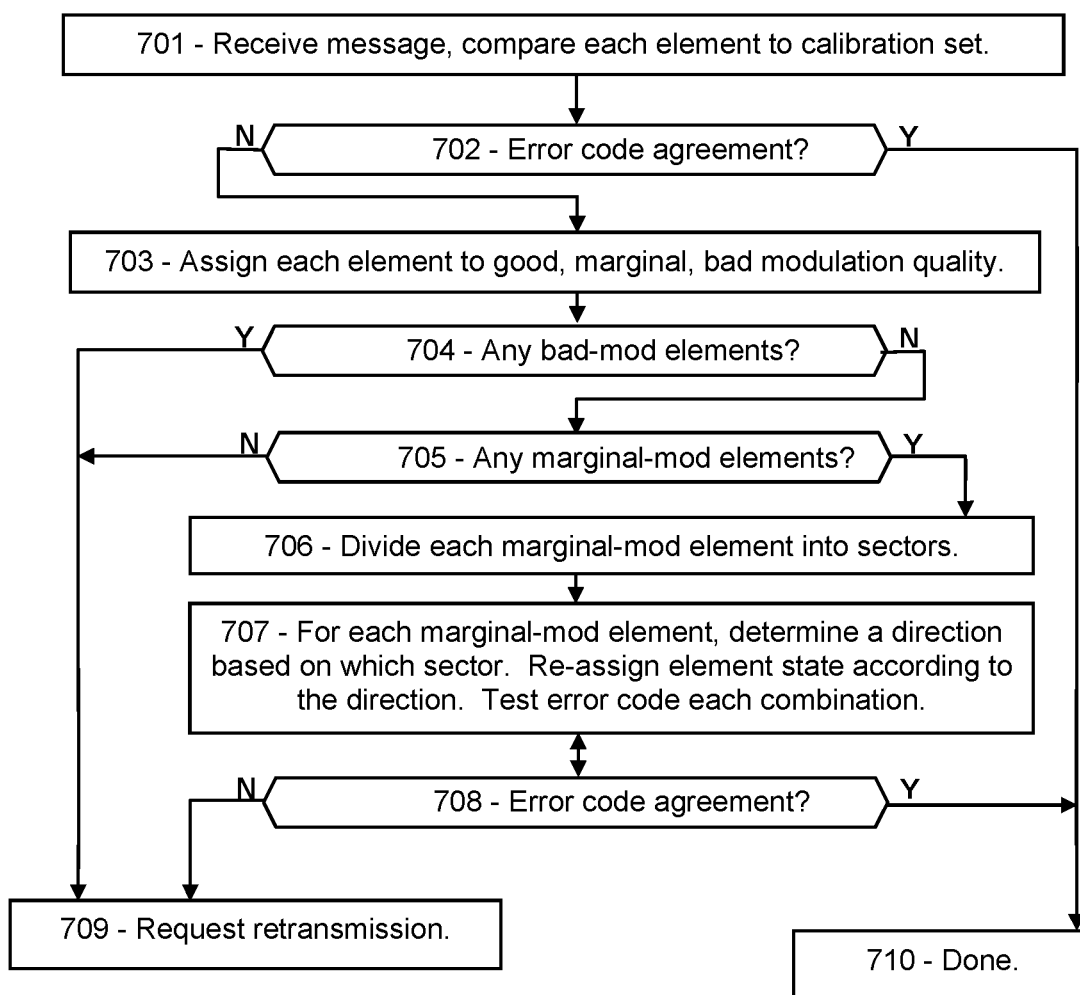
FIG. 7 is a flowchart showing an exemplary embodiment of a process for detecting and correcting message errors according to directional deviation sectors, according to some embodiments.

FIG. 7 is a flowchart showing an exemplary embodiment of a process for detecting and correcting message errors according to directional deviation sectors, according to some embodiments. As depicted in this non-limiting example, a receiver may receive a message at 701, and demodulate each message element using a previously determined calibration set including the branch amplitude levels of the modulation scheme, At 702, the receiver can compare the message to an embedded error-detection code. If the message passes the EDC test, the task is done at 710. If not, at 703 the receiver may allocate each message element to good, marginal, or bad-modulation zones according to the distance from the modulation of the message element to the nearest state, or according to the nearest I and Q amplitude levels. At 704, the receiver determines whether any of the message elements occupies the bad-modulation zone, and if so, the receiver may alter the bad-modulation elements or request a retransmission at 709. If there are no bad-modulation elements, the receiver may determine at 705 whether there are any marginal-modulation elements, in which case the receiver may attempt to recover the message using the sector information. At 706, if not sooner, the receiver may divide each marginal-modulation zone into sectors according to position, and at 707 may determine a direction based on the amplitude deviations of the message element relative to the amplitude levels of the modulation scheme, and may allocate each marginal-modulation message element to one of the sectors. The receiver may then alter each marginal-modulation message element to the adjacent modulation state in the direction indicated by the occupied sector, and may test that variation against the error-detection code. If the altered message passes the error-detection test at 708, the receiver has succeeded in recovering a faulted message and is done. If not, the receiver may request a retransmission and may merge the message with the retransmitted copy, in some embodiments.

In another embodiment, upon receiving a corrupted message, the receiver can calculate a distance value and a direction value according to the modulation of each message element relative to the nearest state of the modulation scheme. To attempt to recover the corrupted message, the receiver can select the message element with the largest distance value, and can alter that message element's state assignment to an adjacent state according to the direction value, and test that altered version against the error-detection code. The receiver can then alter other message element assignments according to their distance values, starting with the largest distance values, and altering each of the message elements to adjacent states according to the direction value. The receiver can perform a nested search among the message elements with distance values exceeding a threshold, for example, testing each such combination. The receiver can begin by altering the message element with the lowest modulation quality, and then proceed to test message elements with successively higher modulation quality. If not successful, the receiver can then alter the message element with the largest distance across all of the states of the modulation scheme, testing each. The receiver can then select further message elements according to distance and vary each according to their direction values or alternatively across the entire modulation scheme, testing each combination. Thus the receiver can select which message elements to alter, and in what order, based on their distance values instead of the good-marginal-bad categories, and the receiver can alter each message element according to the direction value instead of the deviation sectors. In addition, the receiver can calculate how long it will take to perform the alterations, given the number and size of the distance values of the message elements, and can determine whether the amount of time will likely exceed the time required for a retransmission, in which case the receiver may request the retransmission before or concurrently with performing the alterations and tests just described.

Figure 8:
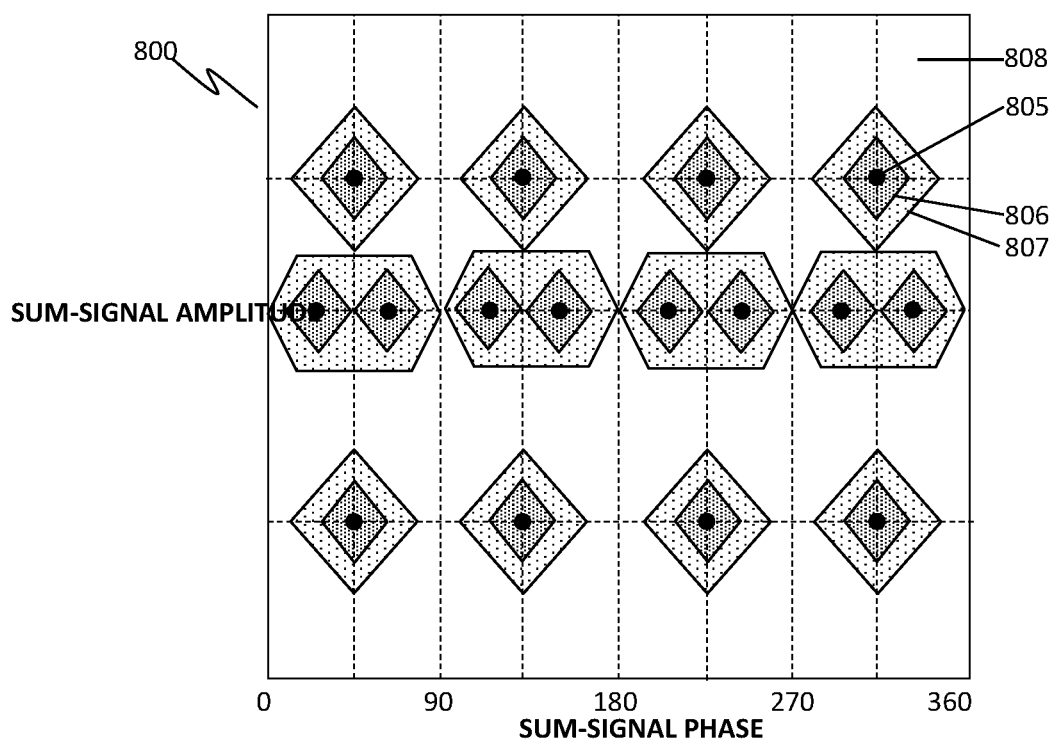
FIG. 8 is a modulation table showing an exemplary embodiment of modulation states and error zones, according to some embodiments.

FIG. 8 is a modulation table showing an exemplary embodiment of modulation states and error zones, according to some embodiments. As depicted in this non-limiting example, a modulation table 800 is an array of modulation states of a modulation scheme, arranged according to a phase and an amplitude of the as-received signal. In the case of a PAM-modulated message, the as-received signal may be the sum-signal, which is equal to the I-branch wave added to the Q-branch wave. In this case, the receiver analyzes the sum-signal without separating the I and Q components. For example, the receiver can analyze the sum-signal for its overall amplitude and phase. Such an analysis corresponds to classical amplitude and phase demodulation. The amplitude and phase of the sum-signal may provide information about noise and interference more readily and/or more precisely than amplitude analysis of the I and Q branches of PAM, in some embodiments.

The depicted modulation scheme in this case is 16QAM, transmitted according to PAM and analyzed according to the amplitude and phase of the sum-signal. Each state is depicted as a dot 805. The non-uniform distribution of states 805 is due to the effects of trigonometrically adding two sinusoidal waves at different phases and amplitudes. Although the position of each state on the modulation table 800 is deterministically determined by the amplitude modulations of the I and Q branches in the ideal case, in practical systems the demodulation results are subject to noise and interference as well as measurement uncertainties. Hence, the sum-signal wave properties, including its amplitude and phase, may provide distinct or at least improved information about which message elements are likely faulted. In some embodiments, each message element may be analyzed by both methods, including amplitude analysis of the separate I and Q branches, and amplitude-phase analysis of the sum-signal before branch separation. Those results may be combined by, for example, allocating a message element to a "suspicious" category if the message element fails a modulation-quality test by either PAM analysis or sum-signal amplitude-phase determination.

In some embodiments, a good-modulation zone 806 and a larger marginal modulation zone 807 may be defined around each state 805 in the modulation table 800, with a bad-modulation zone 808 exterior to the other zones. Message elements in which the sum-signal amplitude and phase occur in the marginal 807 or bad modulation 808 zones may thereby reveal faults that may not be exposed in PAM analysis due to their different sensitivities to interference-induced phase errors, among other differences. In some embodiments, the receiver may test each message element according to the amplitude and phase properties of the sum-signal, then separate the I and Q branches and test each of them for agreement with one of the predetermined branch amplitude levels, and thereby flag a message element as suspicious if the message element appears in the bad or marginal modulation zone according to either the PAM analysis or the amplitude-phase analysis. The receiver may also check that the sum-signal amplitude and phase values are consistent with the PAM state determined from the I and Q branches, and thereby apply yet another independent fault detection test. The receiver may thereby reveal suspicious message elements that may be missed if tested using only a single analysis type.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways, such as a stepped transition between modulations of adjacent resource elements instead of a sharp transition. Detection of time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

Figure 9:
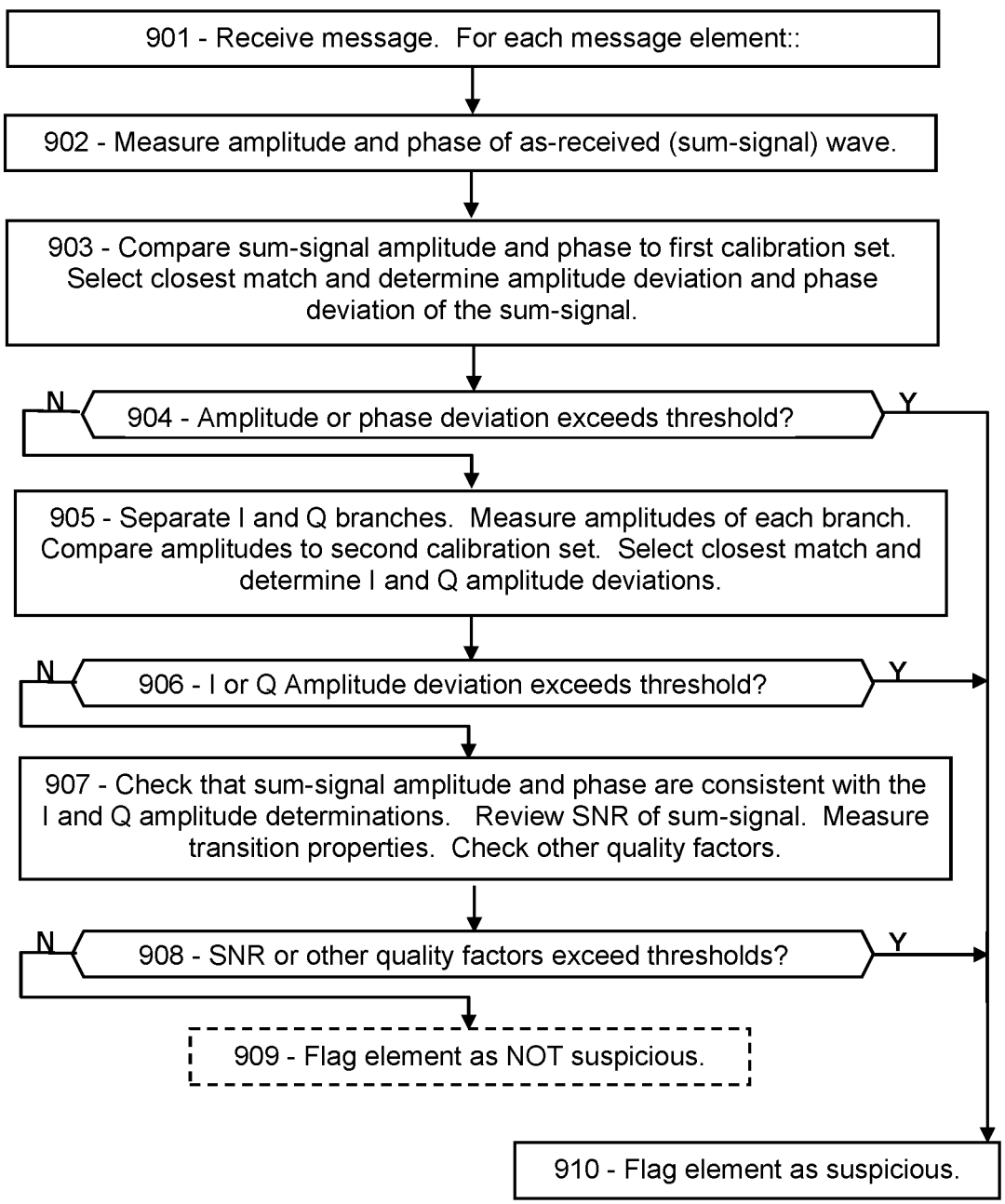
FIG. 9 is a flowchart showing an exemplary embodiment of a procedure for detecting message faults by measuring sum-signal properties, according to some embodiments.

FIG. 9 is a flowchart showing an exemplary embodiment of a procedure for detecting message faults by measuring sum-signal properties, according to some embodiments. As depicted in this non-limiting example, at message faults may be detected by analyzing each received message element from multiple viewpoints including PAM analysis of the I and Q branches, classic amplitude and phase measurements of the sum-signal, measurement of the SNR or transition properties between message elements, and other measures of message quality as may be devised.

At 901, a message comprising message elements is received. For each message element, the rest of the flowchart is then implemented. At 902, the amplitude and phase of the as-received sum-signal are measured and, at 903, compared to a first calibration set that includes the expected amplitude and phase levels of the modulation scheme according to a PAM modulation technology. The receiver may further determine an amplitude deviation and a phase deviation of the message element's sum-signal relative to the closest amplitude-phase match in the first calibration set. Then at 904, the receiver can determine whether the amplitude and/or phase deviation of the sum-signal exceeds a predetermined threshold (including optionally separate thresholds for amplitude and phase). In addition, or alternatively, the amplitude and phase deviations may be combined (and optionally normalized) to determine a distance or a modulation quality of the sum-signal relative to the closest state, and thereby determine whether the distance exceeds a threshold. At 904, if the amplitude deviation or phase deviation of the sum-signal, or other combination, exceeds a predetermined threshold, then at 910 the message element is flagged as "suspicious", although it may be assigned to the nearest state of the modulation scheme anyway.

At 905, the receiver may separate the I and Q branches, then measure the branch amplitudes and compare to a second calibration set that includes the amplitude levels of PAM, including positive and negative levels, as determined from a prior demodulation reference, for example. The receiver may then select the closest match in the second calibration set, and thereby measure the I and Q amplitude deviations of the message element relative to that closest state. At 906, the receiver may determine whether the I or Q amplitude deviations, or both, exceed a threshold, and if so, flag the message element as suspicious at 910.

At 907, the receiver may check whether the amplitude and phase values determined for the sum-signal are in fact consistent with the PAM state implied by the branch-amplitude values for the I and Q branches. The receiver may also measure the SNR of the sum-signal during the symbol-time of the message element. The receiver may measure the transition properties of the sum-signal in switching between the preceding and/or the succeeding message element. The receiver may further determine other parameters related to the modulation quality or likely fault status of the message element. At 908, the receiver may determine whether the SNR or transition properties or other factors exceed their relevant thresholds, and if so, flag the message element as suspicious.

At 909, if the message element passes all of the above tests, the receiver may optionally (in dash) flag the message element as not suspicious. Alternatively, the receiver may simply move on to the next message element without recording anything about the successful message element, since non-faulted may be the default status of most message elements, absent evidence to the contrary.

By performing quality tests on message elements based on PAM amplitudes as well as sum-signal amplitude and phase properties, the receiver may thereby reveal likely faulted message elements that may be difficult to detect using just one of the demodulation technologies. By further including other quality factors such as SNR and transition parameters in the analysis, an improved determination of which message elements are likely faulted and which are likely non-faulted may become feasible. Then, if the number of suspicious message elements is within a practical limit, the receiver may alter each of the suspicious message elements according to their nearest neighbors, optionally with directional assistance, and test each such alteration against the error-detection code, and thereby rescue a faulted message while avoiding the delays and costs involved in seeking a retransmission.

The systems and methods disclosed herein further include procedures for merging a message with a retransmitted copy of the same message. If the retransmitted copy of the message agrees with the embedded error-detection code, then the task is done. However, if both of the message versions disagree with the error-detection code, then the two messages can be merged by taking the message elements with the best modulation quality from each of the two versions. Even if both message versions contain faults, it is likely that the faults will occur in different message elements in the two copies. It is also likely that the faulted message elements will have lower-quality modulation (that is, larger deviation from the nearest state of the modulation scheme) than the correctly received message elements. Therefore, by taking the better-modulation-quality message elements from each of the two versions, the merged message is likely to be fault-free, as demonstrated in the following examples.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways. Detection of such time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

Figure 10:
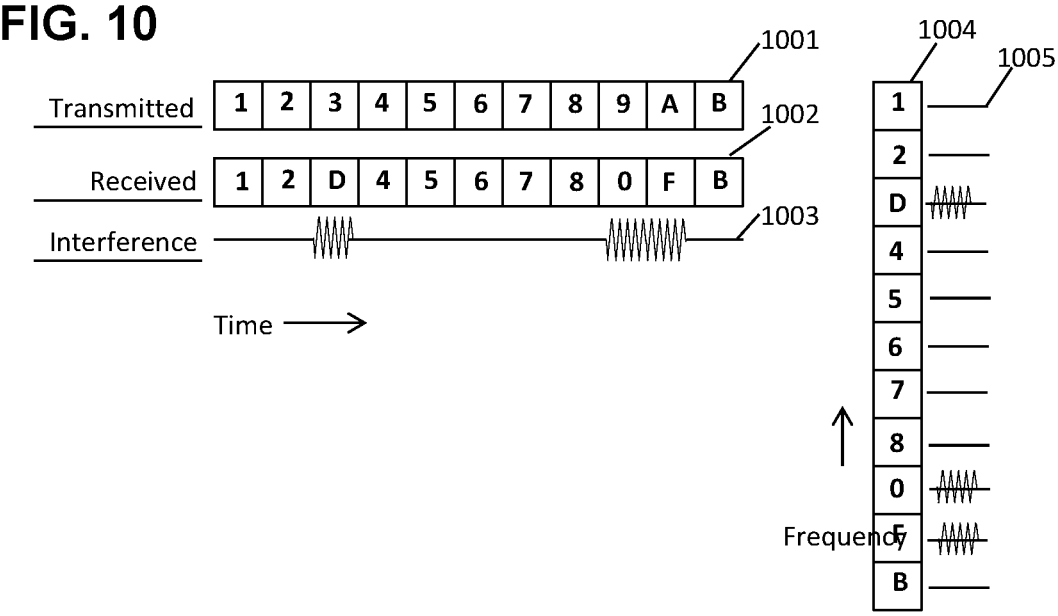
FIG. 10 is a schematic showing an exemplary embodiment of messages with interference faults, according to some embodiments.

FIG. 10 is a schematic showing an exemplary embodiment of messages with interference faults, according to some embodiments. As depicted in this non-limiting example, a message is shown on successive lines, the original message labeled as "Transmitted", and the same message as "Received" with specific faults, and a plot of the interference. A first message 1001 is transmitted as time-spanning, that is, occupying successive symbol times at a single frequency. Each message element is modulated according to a hexadecimal character in 16QAM. The original message is "123456789AB" as shown. The received message 1002 includes three message elements changed or faulted. The interference 1003 is shown as a function of time, with jagged lines indicating when interference is present. The received message 1002 indicates that the "3" in the transmitted message 1001 has been changed to a "D" in the received version, and the "9" has been changed to a "0", and the "A" has been changed to a "F", due to the interference 1003.

Also shown is a second message 1004, this example being frequency-spanning, that is, occupying successive subcarriers at a single symbol time. Again, three of the message elements have been changed by interference to different values by the frequency-dependent interference 1005 as indicated by jagged lines opposite to the subcarriers affected by the interference. The interference 1003 or 1005 caused an I or Q branch amplitude change or both, resulting in the incorrect demodulation of the three message elements and hence a corrupted message. The task of the systems and methods disclosed herein may be to identify which message elements have been changed by interference, and if possible to determine the original values of the changed message elements.

Figure 11:
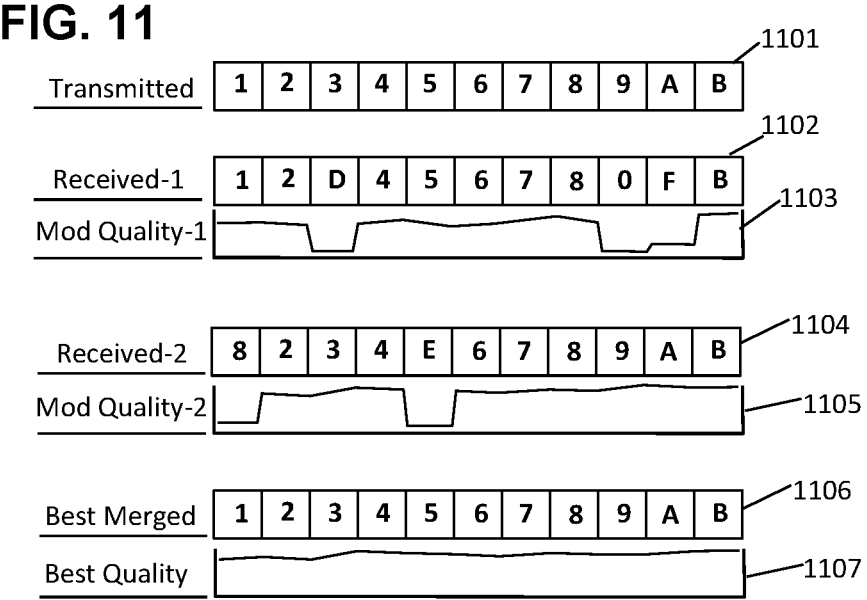
FIG. 11 is a schematic showing an exemplary embodiment of a procedure for merging messages with interference faults, according to some embodiments.

FIG. 11 is a schematic showing an exemplary embodiment of a procedure for merging two messages, each containing multiple interference faults, according to some embodiments. As depicted in this non-limiting example, an original message is shown as-transmitted 1101 and time-spanning. The message as-received 1102 includes three incorrect characters due to noise or interference. In addition, the receiver has determined the modulation quality of each message element by measuring the deviations of the I and Q branch amplitudes from the nearest state of the modulation scheme. For example, the modulation quality may be inversely related to the distance from the observed modulation to the amplitude levels of the nearest state, so that larger differences are allocated as a lower modulation quality, for example. The faulted message elements are likely to have poor modulation quality, because their modulation has been randomly distorted by the interference. The line chart 1103 labeled "Mod Quality 1" shows the modulation quality versus time, determined by the receiver while the message elements are received. Most of the message elements have high modulation quality, but the third, ninth, and tenth message elements have low modulation quality due to the distortion effects of interference.

The receiver can determine that the received message 1102 is corrupted using an appended or embedded error-detection code (not shown), and has requested a retransmission of the same message 1101. The second copy 1104, labeled "Received-2", also has errors. Specifically, the first and fifth message elements are now changed by the ongoing bursty interference. The observed modulation quality during the second reception 1105 is shown, indicating poor modulation quality during those two altered message elements.

To recover the original message, the receiver can merge the two messages 1102, 1104. For each message element of the merged message, the receiver can compare the modulation quality of the corresponding message elements of the first and second messages, and can select whichever version has the better modulation quality. Faulted message elements generally have low modulation quality, as mentioned. The merged message 1106 is shown as "Best Merged", obtained by selecting each message element from the first or second copy with higher modulation quality. In this case, and in most cases of practical concern, the two message copies have faults in different message elements. Thus each of the faulted message elements in the Received-1 message are unfaulted in the Received-2 message, and each of the faulted message elements in the Received-2 message are unfaulted in the Received-1 message. For example, the receiver can select the first message element from Received-1 since it has a better modulation quality than the first message element in Received-2, and can select the third message element in Received-2, the fifth in Received-1, and so forth, selecting the better-quality version for each message element in the merged message. By preparing the merged message by selecting the better quality version for each message element, all of the faults have been removed in the merged message 1106 as indicated by the "Best Quality" chart 1107. Therefore the merged message 1106 is correct and passes the error-detection test.

Rarely, the first and second messages may have a fault in the same message element position, in which case the merged message will also contain that fault. In that case, the receiver can try various procedures. For example, the receiver can determine a direction based on the branch amplitude modulations of each marginal-modulation message element, the direction being relative to the closest state. The receiver may alter that message element in the direction indicated, and may thereby test the adjacent state in the indicated direction. Such a test may mitigate small distortions in amplitude, which generally shift a message element to an adjacent state. Such an adjacent-state test, altering the assigned state of certain message element in an indicated way, may be quicker than an exhaustive search. If that fails, the receiver can alter the suspicious message elements to each of the other nearest-neighbor states and test each of those combinations against the error-detection code, which may mitigate larger distortions than the test based on the indicated direction. If that fails, the receiver may vary the suspicious message element across all of the remaining states of the modulation scheme, testing each against the error-detection code. In these ways, the receiver may determine the correct value and mitigate the remaining faults without requiring transmission of a completely error-free received version, and without having to request and wait for a third transmission.

It may be noted that prior-art methods for merging messages, such as "soft combining", generally do not measure or use the modulation quality in determining the values of the merged message elements. Instead, the prior-art procedures generally involve averaging the raw branch amplitude values of the received message elements. However, the statistical improvement in such blind averaging is at most $\sqrt{N}$, where N is the number of copies being averaged, and this improvement is generally obtained only when the distortions are random and Gaussian distributed. For common cases in which the distortions are caused by bursty and frequency-rich interference, averaging additional copies can actually increase the errors in the merged message by adding new distortions to the message elements. The disclosed procedure avoids this problem by selecting the best modulation quality message elements from each of the received copies, without averaging. Since a correct message element is more likely to have a high modulation quality, and a faulted message element is more likely to have a poor message quality, the improvement tends to be proportional to N, instead of $\sqrt{N}$. Embodiments of the disclosed procedure, for exploiting the modulation quality to select message elements for the merged message, can therefore provide a significant reliability improvement in high-background environments or when reception is weak, such as when a user device is at long range from a base station, or when the transmitter is obscured by an obstruction, for example.

In some embodiments, the receiver may merge two versions of a message by selecting which version of each message element to insert into the merged message, the selecting being according to an algorithm. For example, the algorithm may take, as input, the SNR of the message element's signal, and the modulation quality as measured by the I and Q branch amplitude deviations relative to the nearest state of the modulation scheme, and other measures of demodulation fidelity. The algorithm may provide, as output, an overall quality parameter, and the receiver may select which of the message element versions to include in the merged message according to that overall quality parameter. As a further option, the receiver may monitor the amplitudes of the message elements when the modulation scheme is phase-only, such as BPSK or QPSK. If a message element has an amplitude (magnitude) that differs substantially from the other message element amplitudes, the deviating message element may be suspect, since the amplitude variation may be an indication of interference.

Figure 12:
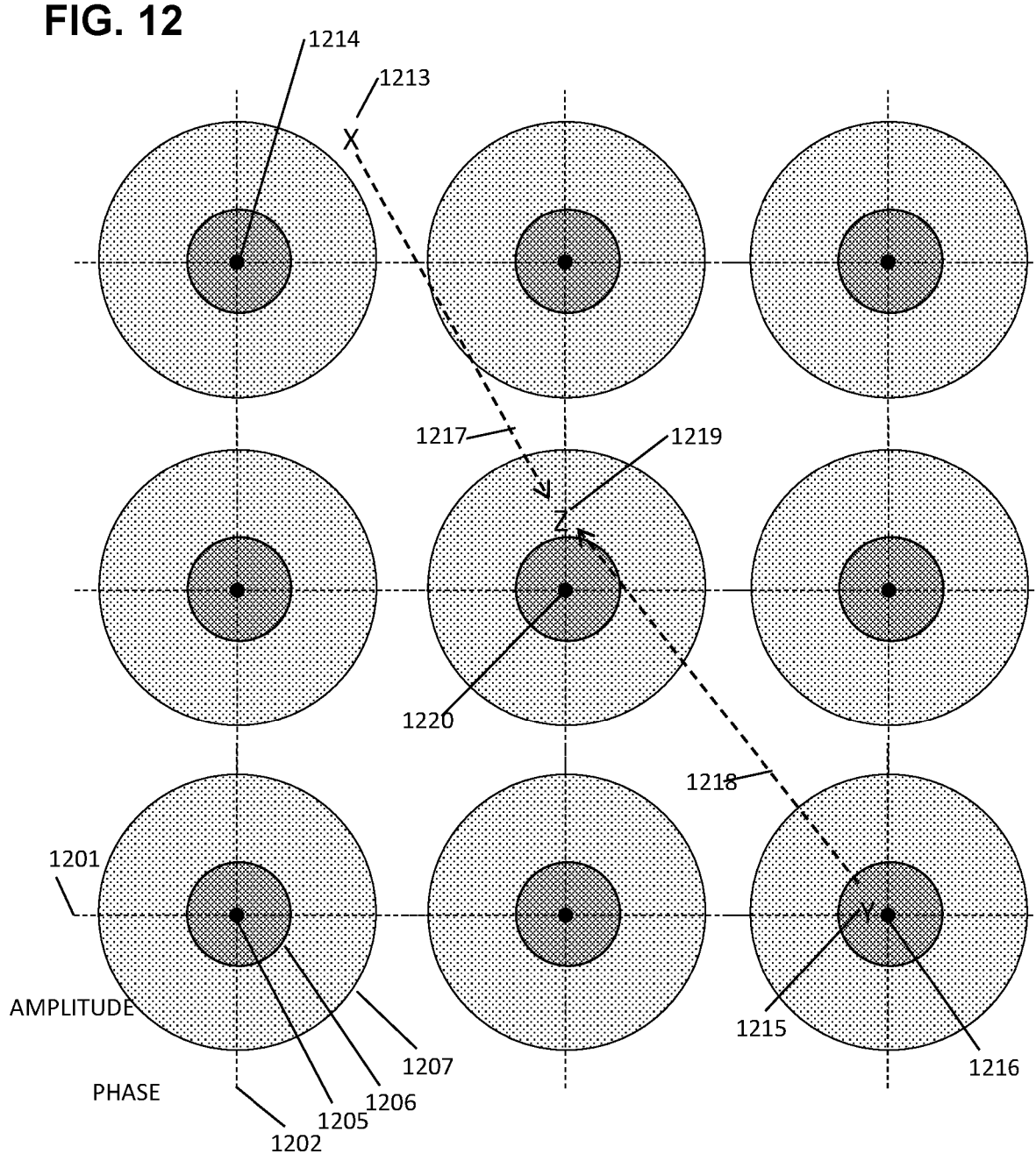
FIG. 12 is a schematic showing an exemplary embodiment of a modulation table with message faults, according to some embodiments.

FIG. 12 is a schematic showing an exemplary embodiment of a modulation table with message faults, according to some embodiments. As depicted in this non-limiting example, a portion of a modulation table is shown with Q-branch amplitude levels 1201 and I-branch amplitude levels 1202, including states 1205, good-modulation zones 1206 in dark stipple, and marginal-modulation zones 1207 in light stipple. A message is received with a message element indicated as the "X" 1213 which is in the bad-modulation zone exterior to all of the marginal-modulation zones 1207. The correct value for that message element is a distant state marked 1216, but there is no way for the receiver to know that fact. Instead, the receiver has assigned the message element 1213 to the closest state, which is 1214.

Due to the incorrect assignment of the message element, the received message failed the error-detection test. The receiver requests and obtains a retransmission. In the second copy, the message element is modulated as the "Y" 1215, which is in the good modulation zone of the correct state 1216. Without determining the modulation quality, the receiver has no way to know which of the versions, X or Y (1213, 1215) is correct, or if either is correct. Therefore, using soft-combining or other averaging-based procedure, the receiver may average the two versions as indicated by dashed arrows 1217, 1218, thereby obtaining an averaged message element "Z" 1219. Since the averaged element 1219 is close to a state 1220, the receiver may assign the message element to state 1220. However, this assignment is still incorrect; the correct state is 1216. Averaging a correct reception with an incorrect reception usually does not solve the problem. Using a signal averaging technique, absent the systems and methods disclosed herein, the receiver may require many additional retransmissions to finally determine that the correct state is 1216, a substantially time-consuming process.

In contrast, the procedure disclosed herein, selecting the merged message elements according to modulation quality, may avoid such delays. For example, the receiver may select which version of each message element to use in the merged message, according to modulation quality. In the depicted case, the receiver would select "Y" 1215 in the merged message because the "Y" is in the good-modulation zone of state 1216, the correct value. Selecting between two message versions according to the modulation quality of each message element individually, may thereby resolve the faults in the merged copy.

A key difference between the disclosed method and prior art methods may be that prior art methods generally discard valuable information, specifically the modulation quality, which the current procedure exploits to advantage.

Figure 13:
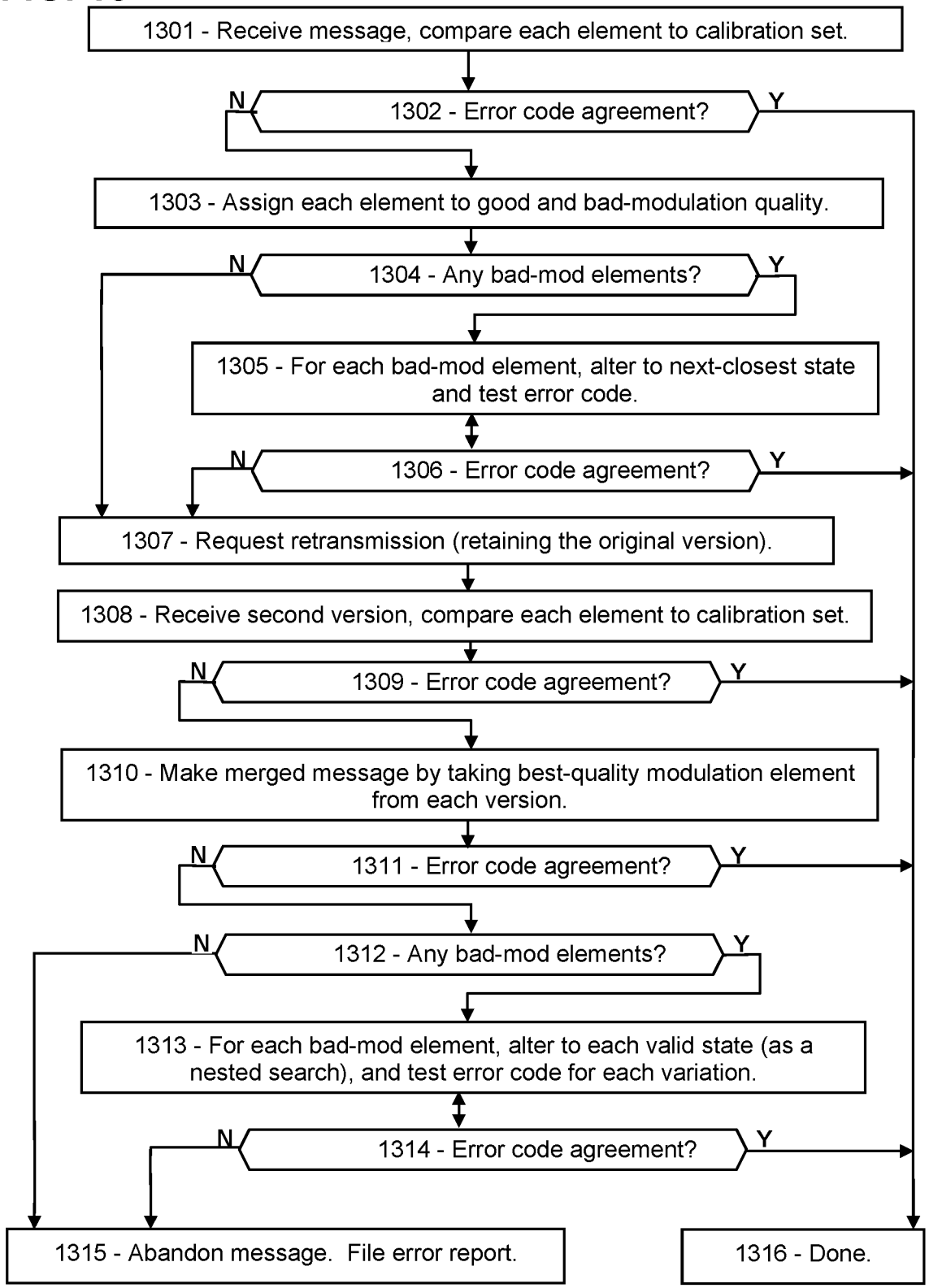
FIG. 13 is a flowchart showing an exemplary embodiment of a process for detecting and correcting message errors by merging copies, according to some embodiments.

FIG. 13 is a flowchart showing an exemplary embodiment of a process for detecting and correcting message errors by merging two transmitted versions, according to some embodiments. As depicted in this non-limiting example, a receiver receives a message at 1301 and demodulates it using a calibration set that includes the I and Q branch amplitude levels of the modulation scheme. The receiver then, at 1302, compares the message to an embedded error-detection code and, if agreed, drops to 1316 and is done. If not, the receiver may assign, to each message element, a modulation quality according to how close the message element amplitude modulations are to the closest amplitude levels in the calibration set. For example, the receiver may assign good-modulation quality to message elements which are within a predetermined distance from the nearest state, and bad-modulation quality to those farther from the nearest state, at 1303.

At 1304, the receiver determines whether the message includes any bad-modulation message elements. If the message elements are all good-modulation quality elements, yet the message is still corrupted as determined by the error-detection code, then the receiver has little choice but to request a retransmission at 1307. However, if at 1304 one or more of the message elements has bad-modulation quality, then at 1305 the receiver can alter each of the bad-modulation elements to the next-closest state and test that altered version at 1306. (The "next-closest" state is the state that is closer than any of the other states, other than the closest state.) The receiver can test each of the bad-modulation elements individually or in combinations, as in a nested grid search, as indicated by the double-ended arrow. If any of those combinations agrees with the error-detection code, the task is done. If not, the receiver requests a retransmission at 1307.

At 1308, the receiver demodulates the second copy of the message and tests it against the error-detection code at 1309. If in agreement, the task is done. If not, the receiver can merge the first and second copies by selecting whichever message element, of the first and second copy, has the better modulation quality at 1310. The receiver can then, at 1311, test whether the merged message agrees with the error-detection code. Since the error-detection code is generally the same for the first and second messages, either version of the error-detection code can be used. If, however, a fault occurs in the error-detection code of one of the versions, then the receiver can repair it by taking the best modulation quality version of each message element (including the message elements of the error-detection code) in constructing the merged message, and may use that repaired code for testing the merged message.

If at 1311 the message is still corrupted, the receiver can then determine whether the merged message has any bad-modulation elements at 1312. If there are still some bad-modulation elements in the merged message at 1312, and if the number of remaining bad-modulation elements is less than a predetermined limit, the receiver can alter each bad-modulation element to each of the states at 1313. The receiver can alter the remaining bad-modulation elements singly or in combination, and can test each variation against the error-detection code at 1314, as indicated by a double-ended arrow. In addition, the receiver can determine whether there are any paradoxical message element, which differ between the two message versions but is good-mod in both versions. The receiver can re-allocate those message elements as suspicious for further alterations and testing. If one of those variations succeeds, the task is done at 1316. If not, or if there are no bad-modulation elements to vary at 1312, the receiver may abandon the message at 1315 and file an error report.

In various embodiments, if all of the merged message elements are good modulation, yet the message still fails the error-detection test, then the receiver can either request a third copy, or begin varying the good-modulation message elements at random, or abandon the message. In most cases it is not feasible to vary the good-modulation elements across all the states in a grand nested search, because (a) it would take too long, and (b) one of those variations may accidentally agree with the error-detection code. In addition, there is generally a limit to the number of retransmissions that a receiver can request. Therefore, in this case, the receiver files an error report, which may assist the network in finding whatever caused the problem, and abandons the message at 1315.

In some embodiments, the receiver may determine which message elements to include in the merged message, and which message elements to alter, according to an overall quality factor, which may depend on the modulation quality of each message element, the SNR of each message element's signal, the amplitude variation of each message element relative to other message elements (for phase-only modulation), among other factors. The receiver may use an algorithm to determine which message elements to merge and/or alter. The algorithm may take, as input, the modulation quality, the SNR, and optionally the amplitude variation. The algorithm may provide, as output, the overall quality of each message element. The receiver may then use that output to select message elements for a merged message and/or to select which message elements to alter the state assignments of.

In some embodiments, the receiver may monitor the background noise or interference level and determine that the backgrounds are higher than normal. Then, before requesting a second or third or other retransmission, may wait until the background has subsided, and then may request the retransmission. The transmitting and receiving entities may have agreed to store transmitted messages until getting a positive acknowledgement, for at least a certain storage time. Then, if the receiver determines that the background has returned to normal, or if the storage time is about to expire, can request the retransmission at that time.

In summary, a receiver can test a received message against an embedded error-detection code, determine that the message is corrupted, request and receive a second copy of the message, and determine that the second copy is also corrupted. The receiver can allocate each message element of the first and second messages to categories such as good, marginal, or bad modulation quality according to the difference between the branch amplitude modulation of the message element, and the closest amplitude levels of the modulation scheme, or a mathematical function of those differences. The receiver can then prepare each message element of a merged message by selecting whichever of the corresponding elements in the first and second messages, has the best modulation quality. Since a faulted message element generally exhibits lower quality modulation than correctly transmitted message elements, the merged message is expected to contain fewer (usually zero) remaining faults. In addition, the receiver can determine a direction associated with each message element of the messages, according to the modulation of the message element relative to the nearest state of the modulation scheme, and can correlate the directions of a particular message element in the two messages to identify the correct modulation state of the message element, in some embodiments.

Systems and methods disclosed herein are aimed at improving the error detection capability of receivers in 5G and 6G communications, and recovering faulted messages without a massive search. The receiver may allocate each message element to a good, marginal, or bad-modulation quality based on how far the element's modulation differs from the closest levels of the modulation state. The receiver may attempt to recover a faulted message by altering the assigned state of a message element that exhibits marginal or bad-modulation quality. The receiver may initially alter the suspicious message elements to their immediately adjacent states, and thereby test the most likely effects of low-level noise and interference. In addition, the receiver may determine a direction according to each message element's modulation, and may vary each modulation element according to the direction indicated. In most cases, it is much quicker to resolve the faults by varying just the message elements with the lowest modulation quality, because these are the most likely to be the faulted elements. The systems and methods may enable recovery of messages that would otherwise be discarded or retransmitted, thereby reducing delays, substantially improving reliability under adverse noise or interference conditions, and avoiding unnecessary requests and retransmissions. Network efficiency may be improved thereby, and user satisfaction may be provided, with little or no additional cost, according to some embodiments.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable marginal may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing marginal. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A wireless receiver comprising non-transitory computer-readable media, the non-transitory computer-readable media comprising instructions that when executed by a computing environment cause a method to be performed, the method comprising:
   receiving a first wireless message, wherein the first wireless message comprises a first plurality of message elements, wherein each message element of the first plurality of message elements is modulated according to a modulation scheme, wherein the modulation scheme comprises one or more predetermined amplitude levels and one or more states, wherein each state of the modulation scheme comprises an I-branch signal and a Q-branch signal, wherein the I-branch signal has an I-branch amplitude and the Q-branch signal has a Q-branch amplitude;
   determining that the first wireless message is corrupted;
   receiving a second wireless message, wherein the second message comprises a second plurality of message elements, wherein each message element of the second plurality of message elements is modulated according to the modulation scheme;
   determining that the second wireless message is corrupted;
   producing a merged message comprising a third plurality of message elements, wherein each message element of the merged message is selected from message elements of the first plurality of message elements and the second plurality of message elements according to a criterion;
   determining whether the merged message is corrupted;
   for each state of the modulation scheme, determining a good-modulation zone wherein the I-branch amplitude differs from one of the predetermined amplitude levels by no more than a first predetermined value, and the Q-branch amplitude differs from one of the predetermined amplitude levels by no more than the first predetermined value; and
   for each good-modulation zone, determining a marginal-modulation zone exterior to the good-modulation zone, wherein the I-branch amplitude differs from one of the predetermined amplitude levels by no more than a second predetermined value and the Q-branch amplitude differs from one of the predetermined amplitude levels by no more than the second predetermined value, the second predetermined value being larger than the first predetermined value.

2. The wireless receiver of claim 1, wherein the criterion comprises:
   selecting, as the selected message element, whichever of the message elements, of the first plurality of message elements and the second plurality of message elements, is modulated according to one of the good-modulation zones; and
   if neither of the message elements of the first plurality of message elements and the second plurality of message elements is modulated according to one of the good-modulation zones, then selecting, as the selected message element, whichever of the message elements of the first plurality of message elements and the second plurality of message elements is modulated according to one of the marginal-modulation zones.

3. The wireless receiver of claim 1, the method further comprising:
   separating each of the marginal-modulation zones into two or more sectors;
   determining, for each sector, a direction related to a difference between the sector and the state of the modulation scheme;
   altering a message element of the merged message according to the direction; and
   determining whether the merged message, including the altered message element, is corrupted.

4. A wireless receiver comprising non-transitory computer-readable media, the non-transitory computer-readable media comprising instructions that when executed by a computing environment cause a method to be performed, the method comprising:
   receiving a first wireless message, wherein the first wireless message comprises a first plurality of message elements, wherein each message element of the first plurality of message elements is modulated according to a modulation scheme, wherein the modulation scheme comprises one or more predetermined amplitude levels and one or more states, wherein each state of the modulation scheme comprises an I-branch signal and a Q-branch signal, wherein the I-branch signal has an I-branch amplitude and the Q-branch signal has a Q-branch amplitude;
   determining that the first wireless message is corrupted;
   receiving a second wireless message, wherein the second message comprises a second plurality of message elements, wherein each message element of the second plurality of message elements is modulated according to the modulation scheme;
   determining that the second wireless message is corrupted;
   producing a merged message comprising a third plurality of message elements, each message element of the merged message selected from message elements of the first and second plurality according to a criterion;
   determining whether the merged message is corrupted;
   determining a modulation quality based at least in part on:
   a difference between the I-branch amplitude and one of the predetermined amplitude levels of the modulation scheme;
   a difference between the Q-branch amplitude and one of the predetermined amplitude levels of the modulation scheme; and
   an amplitude and a phase of a sum-signal, the sum-signal comprising the I-branch signal added to the Q-branch signal.

5. A wireless receiver, in a base station or a user node of a wireless network, configured to:
   receive a first message and a second message;
   determine a modulation quality of each message element of the first and second messages;
   prepare a merged message by selecting, for each message element of the merged message, whichever message element of the first and second messages has a higher modulation quality;

determine whether the merged message is corrupted;

wherein each message element, of the first and second messages, is modulated according to a modulation scheme comprising at least one predetermined amplitude level and at least one state, wherein each state comprises an I-branch signal combined with a Q-branch signal, wherein the I-branch signal is offset in phase relative to the Q-branch signal, and wherein the modulation quality of each message element is related to:

an I-branch difference between an amplitude of the I-branch signal and one of the predetermined amplitude levels; and a Q-branch difference between an amplitude of the Q-branch signal and one of the predetermined amplitude levels.

6. The wireless receiver of claim 5, wherein the modulation quality of each message element of the first and second messages comprises at least one of:

a sum comprising a magnitude of the I-branch difference plus a magnitude of the Q-branch difference; or a square-root of a sum comprising a square of the I-branch difference plus a square of the Q-branch difference.

7. The wireless receiver of claim 5, wherein the modulation quality of each message element is inversely related to a distance between a modulation of the message element and a state of the modulation scheme.

8. The wireless receiver of claim 5, wherein:

the first and second messages are modulated according to a modulation scheme, wherein the modulation scheme comprises one or more states and one or more predetermined amplitude levels, wherein each state comprises an I-branch signal and a Q-branch signal, wherein the I-branch signal and the Q-branch signal have different phases; and the determine the modulation quality of a particular message element comprises combine, according to a mathematical expression, an amplitude modulation of the I-branch signal relative to one of the predetermined amplitude levels of the modulation scheme, and an amplitude modulation of the Q-branch signal relative to one of the predetermined amplitude levels of the modulation scheme.

9. A method for correcting a fault in a wireless message, comprising:

receiving a first copy of a message and determining that the first copy of the message is corrupted;

then receiving a second copy of the message and determining that the second copy of the message is corrupted;

determining, for each message element of the first copy of the message and the second copy of the message, a modulation quality according to a difference between a modulation of the message element and a modulation state of a modulation scheme; and preparing a merged message by selecting, for each message element of the merged message, from each message element of the first copy of the message and the second copy of the message, whichever message element has higher modulation quality;

determining one or more sectors according to an amplitude modulation or a phase modulation or both;

determining, according to each sector, a direction comprising an alteration in amplitude or phase or both;

altering a message element of the merged message according to the direction; and determining whether the merged message, so altered, is corrupted.

* * * * *